(12) United States Patent
Kyre et al.

(10) Patent No.: US 11,880,382 B2
(45) Date of Patent: *Jan. 23, 2024

(54) SYSTEMS AND METHODS FOR GENERATING TABLES FROM PRINT-READY DIGITAL SOURCE DOCUMENTS

(71) Applicant: Datawatch Corporation, Bedford, MA (US)

(72) Inventors: Mark Stephen Kyre, Winston-Salem, NC (US); Jeffrey Lucas Eldridge, Greensboro, NC (US); Austin Alexander Spears, Greensboro, NC (US); Samuel Allen Hudock, Greensboro, NC (US)

(73) Assignee: DATAWATCH CORPORATION, Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/817,721

(22) Filed: Aug. 5, 2022

(65) Prior Publication Data

US 2022/0374444 A1 Nov. 24, 2022

Related U.S. Application Data

(63) Continuation of application No. 17/118,128, filed on Dec. 10, 2020, now Pat. No. 11,442,955, which is a (Continued)

(51) Int. Cl.
*G06F 16/25* (2019.01)
*G06K 15/02* (2006.01)
(Continued)

(52) U.S. Cl.
CPC ........ *G06F 16/254* (2019.01); *G06F 40/131* (2020.01); *G06F 40/177* (2020.01);
(Continued)

(58) Field of Classification Search
CPC .... G06F 16/254; G06F 40/131; G06F 40/177; G06F 16/313; G06F 16/951;
(Continued)

(56) References Cited

U.S. PATENT DOCUMENTS

| 4,723,210 A | 2/1988 | Barker et al. |
| 5,832,476 A | 11/1998 | Tada et al. |

(Continued)

FOREIGN PATENT DOCUMENTS

| EP | 1030246 | 8/2000 |
| WO | WO 2005/098683 | 10/2005 |
| WO | WO 2005/098689 | 10/2005 |

OTHER PUBLICATIONS

Carey, "BEA liquid data for Weblogic: XML-based enterprise information integration," Data Engineering, Aug. 2004, pp. 800-803.

(Continued)

*Primary Examiner* — Quoc A Tran
(74) *Attorney, Agent, or Firm* — Fish & Richardson P.C.

(57) ABSTRACT

Systems and methods are provided for generating tables from print-ready digital source documents. A document is received and one or more text fragments are identified on a rendered page of the document. A wrapping region collection is generated, comprising one or more wrapping regions. A tabular, narrative and label score is generated for each wrapping region. A block type is assigned to each wrapping region based on the scores. A wrapping region group and a block set are generated. One or more tables are generated based on text fragments corresponding to one of the one or more blocks. The text fragments are organized into corresponding fields of the one or more tables.

20 Claims, 25 Drawing Sheets

Related U.S. Application Data continuation of application No. 16/408,046, filed on May 9, 2019, now Pat. No. 10,867,127, which is a continuation of application No. 15/612,979, filed on Jun. 2, 2017, now Pat. No. 10,289,670, which is a continuation of application No. 14/993,988, filed on Jan. 12, 2016, now Pat. No. 9,703,766.

(51) Int. Cl.

| | | |
|---|---|---|
| *G06F 40/177* | (2020.01) | |
| *G06F 40/131* | (2020.01) | |
| *G06F 16/31* | (2019.01) | |
| *G06F 16/951* | (2019.01) | |
| *G06F 40/103* | (2020.01) | |
| *G06F 40/106* | (2020.01) | |
| *G06F 40/14* | (2020.01) | |
| *G06V 30/414* | (2022.01) | |

(52) U.S. Cl.
CPC ........ *G06K 15/1814* (2013.01); *G06F 16/313* (2019.01); *G06F 16/951* (2019.01); *G06F 40/103* (2020.01); *G06F 40/106* (2020.01); *G06F 40/14* (2020.01); *G06V 30/414* (2022.01)

(58) Field of Classification Search
CPC ...... G06F 40/103; G06F 40/106; G06F 40/14; G06K 15/1814; G06V 30/414
See application file for complete search history.

(56) References Cited

U.S. PATENT DOCUMENTS

| | | |
|---|---|---|
| 6,091,895 A | 7/2000 | Govindaraj |
| 6,484,150 B1 | 11/2002 | Blinn et al. |
| 6,865,576 B1 | 3/2005 | Gong et al. |
| 7,158,971 B1 | 1/2007 | Bascom |
| 7,275,061 B1 | 9/2007 | Kon et al. |
| 9,703,766 B1 | 7/2017 | Kyre et al. |
| 10,289,670 B2 | 5/2019 | Kyre et al. |
| 10,867,127 B2 | 12/2020 | Kyre et al. |
| 11,442,955 B2 | 9/2022 | Kyre et al. |
| 2002/0069247 A1 | 6/2002 | Pakand et al. |
| 2002/0073080 A1 | 6/2002 | Lipkin |
| 2003/0167213 A1 | 9/2003 | Jammes et al. |
| 2003/0172082 A1 | 9/2003 | Benoit et al. |
| 2003/0198934 A1 | 10/2003 | Sendowski et al. |
| 2005/0055363 A1 | 3/2005 | Mather |
| 2005/0289524 A1* | 12/2005 | McGinnes ................ G06F 8/10 717/140 |
| 2012/0311436 A1* | 12/2012 | Steele ................... G06F 40/106 715/246 |
| 2013/0124953 A1* | 5/2013 | Fan ...................... G06F 40/106 715/202 |
| 2017/0199860 A1 | 7/2017 | Kyre et al. |
| 2017/0322921 A1 | 11/2017 | Kyre et al. |
| 2019/0266233 A1 | 8/2019 | Kyre et al. |

OTHER PUBLICATIONS

PCT International Preliminary Report on Patentability in International Appln. No. PCT/US05/11437, dated Oct. 21, 2008, 4 pages.
PCT International Search Report in International Appln. No. PCT/US05/11437, dated Sep. 22, 2008, 1 page.
PCT Written Opinion in International Appln. No. PCT/US05/11437, dated Sep. 22, 2008, 3 pages.

* cited by examiner

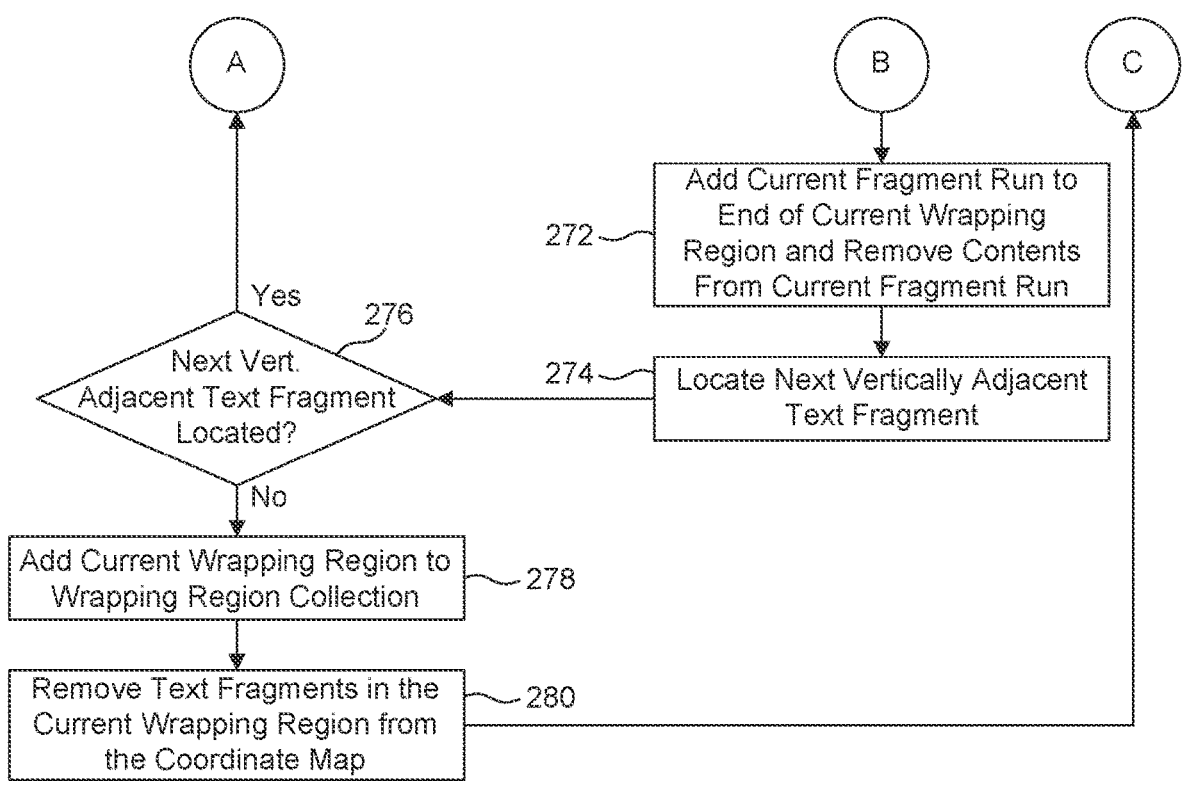
FIG. 2G(II)

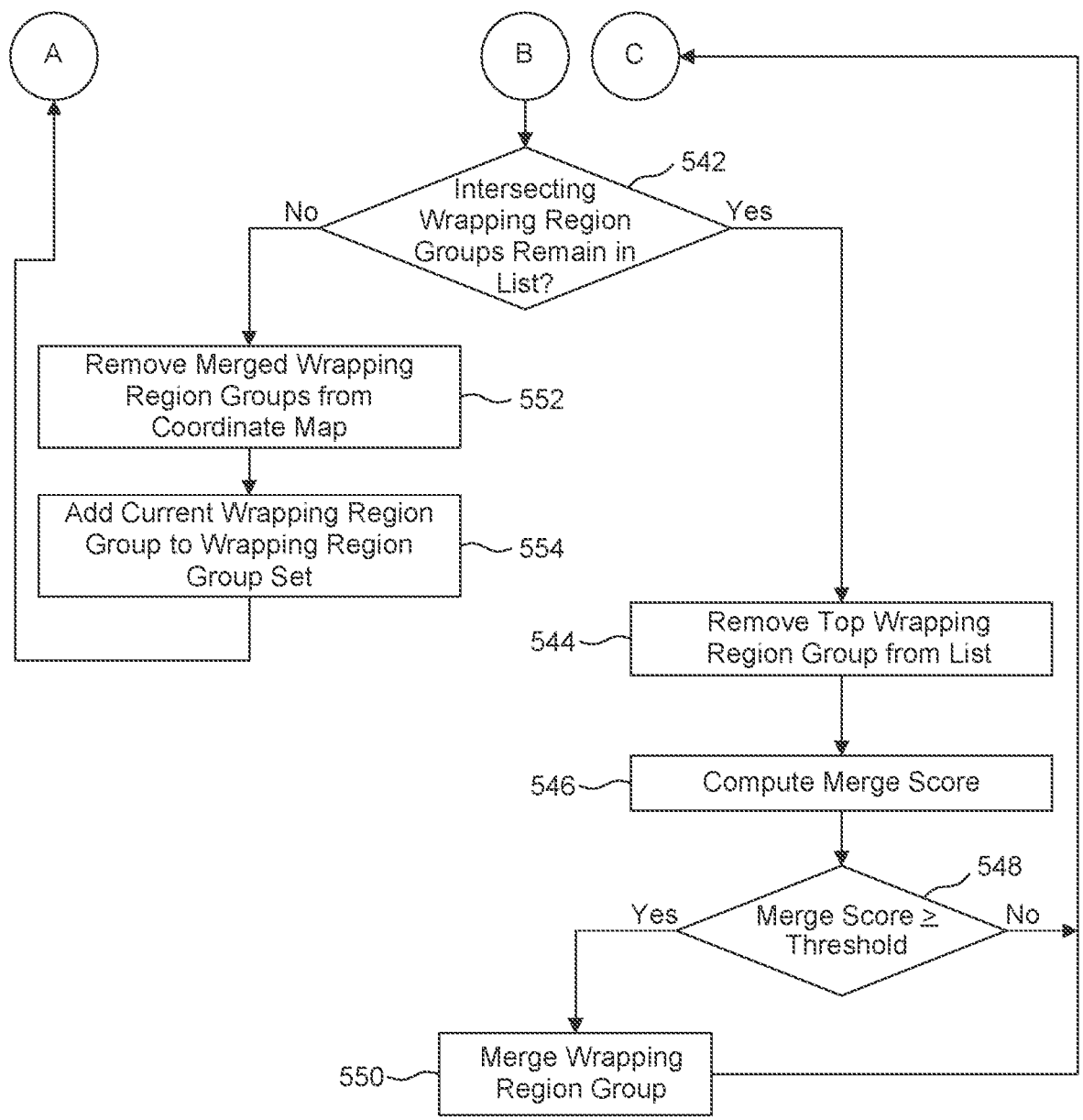
FIG. 5A(II)

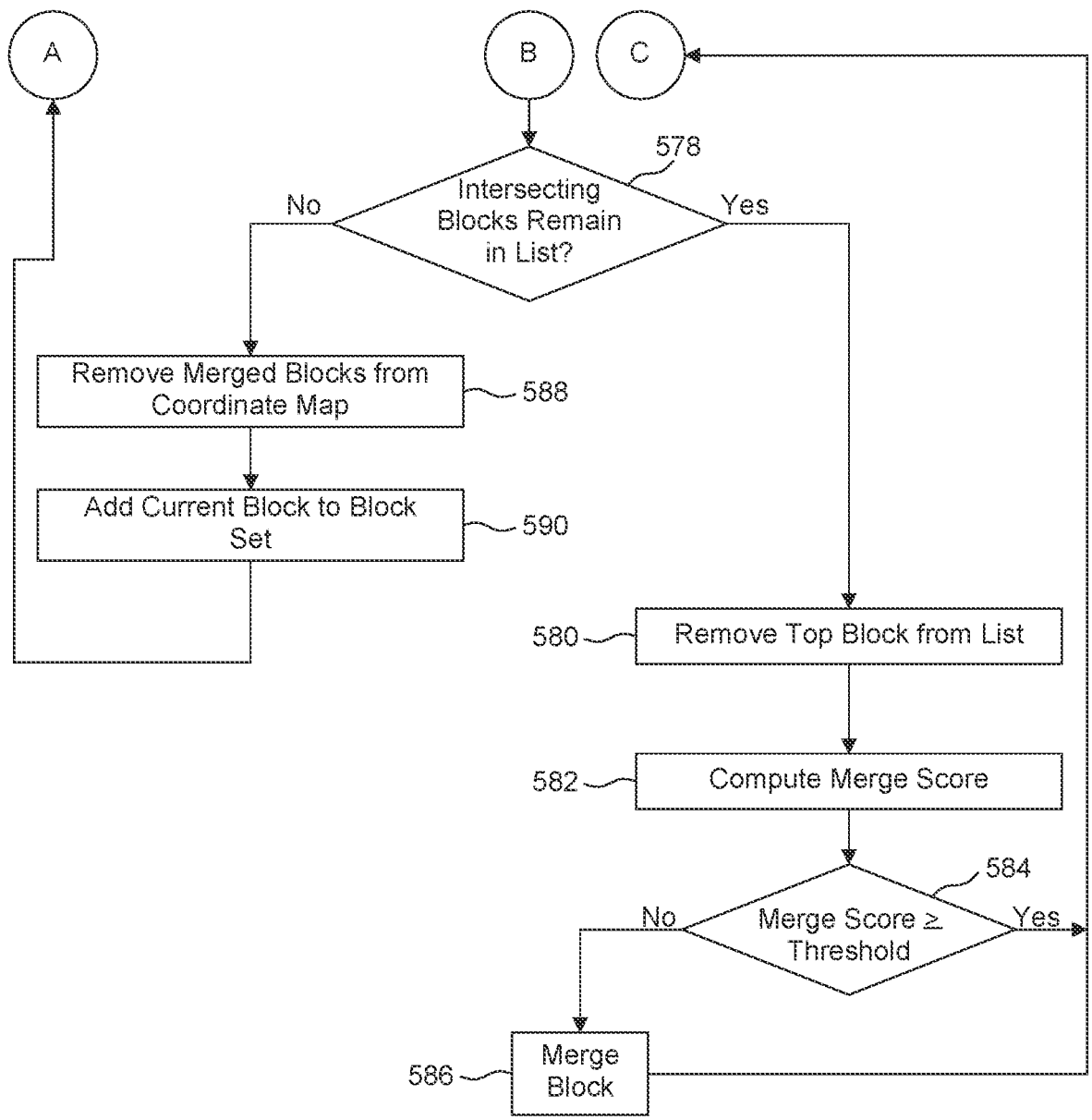
FIG. 5B(II)

| $ Millions | Mar-14 | Mar-15 | Mar-15E | Actual-Estimate | Percent Difference |
|---|---|---|---|---|---|
| Software Licenses | 4.4 | 3.9 | 3.6 | 0.3 | 9% |
| Maintenance | 3.1 | 3.3 | 3.3 | (0.0) | 0% |
| Professional Services | 0.5 | 0.3 | 0.4 | (0.1) | -36% |
| Total Revenues | 8.0 | 7.5 | 7.3 | 0.2 | 2% |
| Cost of Software Licenses | (1.0) | (0.7) | (0.8) | 0.1 | -13% |
| Cost of Maintenance and Services | (0.6) | (1.1) | (0.9) | (0.2) | 17% |
| Total Cost of Revenues | (1.7) | (1.8) | (1.8) | (0.1) | 3% |
| GAAP Gross Profit | 6.3 | 5.7 | 5.5 | 0.1 | 2% |
| Sales & Marketing | (7.6) | (6.6) | (7.9) | (0.2) | -14% |
| Engineering & Product Development | (2.5) | (2.2) | (2.0) | (0.4) | 8% |
| General & Administrative | (2.1) | (2.4) | (2.0) | 0.5 | 20% |
| GAAP Operating Expenses | (12.2) | (11.4) | (12.0) | 0.7 | -5% |
| GAAP Operating Income | (5.9) | (5.8) | (6.4) | | -10% |
| Stock-Based Compensation | 2.1 | 0.8 | 1.8 | (1.0) | -56% |
| Amort of Intangibles, Restructuring, Other | 0.9 | 1.8 | 1.4 | 0.4 | 26% |
| non-GAAP Operating Income | (2.9) | (3.2) | (3.2) | 0.0 | 0% |
| Other Income (Expense) | (1.2) | (0.0) | (0.2) | 0.1 | -93% |
| Pre-Tax Income | (7.1) | (0.7) | (0.6) | 0.8 | -12% |
| Tax Rate | 5% | -1% | 0% | -1% | 0% |
| Income Tax | 0.3 | (1.8) | (1.8) | (0.0) | 0% |
| GAAP Net Income | (6.7) | (6.8) | (6.6) | 0.8 | -12% |
| Reversal of Stock Comp, Amort & Other | 4.0 | 4.0 | 2.1 | (0.6) | -20% |
| non-Cash Tax Effect | 0.8 | 0.0 | 0.9 | 0.0 | 0% |
| non-GAAP Net Income | (2.8) | (3.2) | (3.4) | 0.1 | -4% |
| Basic Shares Outstanding | 9.6 | 11.3 | 11.2 | 0.1 | 1% |
| Diluted Shares Outstanding | 9.3 | 11.2 | 11.3 | 0.1 | 1% |

SYSTEMS AND METHODS FOR GENERATING TABLES FROM PRINT-READY DIGITAL SOURCE DOCUMENTS

CROSS REFERENCE TO RELATED APPLICATIONS

The present application is a Continuation of U.S. patent application Ser. No. 17/118,128, filed Dec. 10, 2020, which is a continuation of U.S. patent application Ser. No. 16/408,046, filed May 9, 2019, (now U.S. Pat. No. 10,867,127), which is a Continuation of U.S. patent application Ser. No. 15/612,979, filed Jun. 2, 2017, (now U.S. Pat. No. 10,289,670), which is a Continuation of U.S. patent application Ser. No. 14/993,988, filed Jan. 12, 2016, (now U.S. Pat. No. 9,703,766), the contents of which are incorporated herein by reference in their entirety.

FIELD OF THE INVENTION

The present invention relates generally to generating tables and more particularly to systems and methods for generating tables from print-ready digital source documents.

BACKGROUND

The digital world has given rise to the rapid growth and expansion of data that is generated, stored, analyzed, and used by a variety of entities including companies, organizations, universities, and individuals. Data is continuously being generated and organized into documents by millions of users and their devices, such as mobile devices, computers, wearable devices, point of sale terminals, navigation devices, and a multitude of sensors stored thereon.

Often, data is compiled, aggregated and/or stored in print-ready digital source documents of file types such as XPS, RTF, PDF and the like. Print-ready digital source documents typically include a multitude of unstructured, semi-structured and/or structured data that is distributed onto fixed locations of a rendered page, rather than into organized lines, rows, cells, or the like. In other words, data on print-ready digital source documents is not organized relative to each other, but is instead fixedly arranged with relation to coordinates of a rendered page.

Print-ready digital source documents are used (e.g., generated, transmitted, stored) in just about any conceivable context or industry, including government, healthcare, education, retail, manufacturing, financial services, telecom, and the like. Print-ready digital source documents are used, for example, to store information, fix information onto rendered pages, printing information, and send information without risking that information being displaced throughout the pages of the document.

The data in the print-ready digital source documents is difficult to access because it is arranged in a non-tabular format, which does not enable it to be easily selected, sorted, modified, charted, and the like. One common theme among entities and individuals generating and using print-ready digital source documents is the desire to make their data more easily accessible, for example, so that it can be analyzed, filtered and used to efficiently and effectively generate tables. This, in turn, makes print-ready digital source document data easier and quicker to consume (e.g., to generate tables), less prone to errors, and more reliable.

There is a need, therefore, for systems and methods that allow for print-ready digital source documents files containing tabular data to be used to generate tables, spreadsheets, and the like. There is also a need for systems and methods that identify relationships between data, classifies data, and aggregates portions of data based on perceived relationship between them. Moreover, there is a need for such systems and methods to be executed with minimal user interaction.

SUMMARY

The example embodiments and implementations presented herein meet the above-identified needs by providing systems and methods for automatically creating tables using auto-generated templates.

In some example embodiments, a method is provided for generating tables from print-ready digital source documents. The method comprises receiving (e.g., from memory, over a network), by a processor of a computing device, a print-ready digital source document (e.g., XPS, RTF, PDF), the digital source document comprising at least one rendered page; identifying, by the processor, one or more text fragments in the at least one rendered page, each of the text fragments comprising text, spatial coordinates indicating the positioning of the text fragment on the rendered page, and an index assigned based on the spatial coordinates on the rendered page (e.g., starting from top left of page, moving left to right and top to bottom); generating, by the processor, a wrapping region collection comprising one or more wrapping regions, wherein each of the wrapping regions comprises one or more fragment runs, and wherein each of the one or more fragment runs comprises a subset of the one or more text fragments that are adjacent to one another and within a predetermined horizontal separation threshold and a vertical separation threshold; calculating, by the processor, for each of the one or more wrapping regions of the wrapping region collection, a tabular score, a narrative score, and a label score, indicating how closely each of the one or more wrapping regions is related to a tabular block type, a narrative block type and a label block type, respectively; assigning, by the processor, a block type (e.g., tabular, narrative, label) to each of the one or more wrapping regions based on the corresponding calculated tabular score, narrative score and label score; generating a wrapping region group set comprising one or more wrapping region groups, wherein each of the one or more wrapping region groups comprises a subset of the one or more wrapping regions that are spatially related to one another (e.g., horizontally, left to right); generating, by the processor, a block set comprising one or more blocks, wherein each of the one or more blocks comprises a subset of the one or more wrapping region groups that are spatially related to one another (e.g., vertically, top to bottom); and generating, by the processor, one or more tables, each of the one or more tables comprising the text fragments corresponding to one of the one or more blocks, wherein each of the one or more tables comprises the corresponding text fragments each organized into corresponding fields (e.g., cells, arranged by row and column) of the one or more tables.

In some example embodiments, generating each of the one or more wrapping regions in the wrapping region collection comprises: identifying, by the processor, a first text fragment (e.g., based on the index of the text fragments, starting with first indexed text fragment; text fragment i) from among the one or more text fragments; assigning, by the processor, a current text fragment flag to the first text fragment, the current text fragment flag indicating a single one of the one or more text fragments being processed; generating, by the processor, a current wrapping region and a current fragment run; adding, by the processor, the first text fragment having the current text fragment flag assigned thereto to the current fragment run; identifying, by the processor, a second text fragment (e.g., based on the index of the text fragments; the next text fragment on the rendered page; text fragment i+1) from among the one or more text fragments, the second text fragment being horizontally adjacent (e.g., from left to right) to the first text fragment having the current text fragment flag assigned thereto, within the predetermined horizontal separation threshold; assigning, by the processor, the current text fragment flag to the second text fragment; adding, by the processor, the second text fragment having the current text fragment flag assigned thereto to the current fragment run; adding, by the processor, the current fragment run to the end of the current wrapping region (e.g., thereby compiling a first line of text fragments in a table), wherein the current wrapping region comprises a bounding box comprising borders matching outer borders of fragment runs comprised therein (e.g., expanded each time the current fragment run is added); identifying, by the processor, a third text fragment (e.g., based on the index of the text fragments; the next text fragment on the rendered page; text fragment i+1) from among the one or more text fragments, the third text fragment being the leftmost of the one or more text fragments that is within the predetermined vertical separation threshold and the predetermined horizontal separation threshold of a bottom border of the bounding box of the current wrapping region; assigning, by the processor, the current text fragment flag to the third text fragment; removing, by the processor, the contents of the current fragment run; adding, by the processor, the third text fragment having the current text fragment flag assigned thereto to the current fragment run; identifying, by the processor, a fourth text fragment (e.g., based on the index of the text fragments; the next text fragment on the rendered page; text fragment i+1) from among the one or more text fragments, the fourth text fragment being horizontally adjacent (e.g., from left to right) to the third text fragment having the current text fragment flag assigned thereto, within the predetermined horizontal separation threshold; assigning, by the processor, the current text fragment flag to the fourth text fragment; adding, by the processor, the fourth text fragment having the current text fragment flag assigned thereto to the current fragment run; and adding, by the processor, the current fragment run to the end of the current wrapping region (e.g., thereby compiling a second line of text fragments for the table).

In some example embodiments, identifying the third text fragment is performed in response to identifying the absence of other text fragments from among the one or more text fragments that are horizontally adjacent (e.g., from left to right) to the second text fragment.

In some example embodiments, the tabular score, the narrative score and the label score of each of the one or more wrapping regions are calculated based on one or more attributes selected from the group consisting of (i) a normalization ratio, (ii) a density ratio, (iii) an alignment ratio, (iv) a capital or non-alphabetic ratio, (v) a text fragment quantity, and (vi) a bold count.

In some example embodiments, the block type assigned to each of the one or more wrapping regions corresponds to the highest of the tabular score, the narrative score, and the label score calculated for the respective wrapping region.

In some example embodiments, the normalization ratio indicates a degree of normalized fragments among the subset of the one or more text fragments corresponding to each of the one or more wrapping regions, wherein the density ratio indicates a density value of fragments among the subset of the one or more text fragments corresponding to each of the one or more wrapping regions, wherein the alignment ratio indicates the degree of aligned text fragments among the subset of the one or more text fragments corresponding to each of the one or more wrapping regions, wherein the capital or non-alphabetic ratio indicates a degree of text fragments, among the subset of the one or more text fragments corresponding to each of the one or more wrapping regions that begin with either a capital letter or a non-alphabetic character, wherein the text fragment quantity indicates a number of text fragments among the subset of the one or more text fragments corresponding to each of the one or more wrapping regions, and wherein the bold count indicates a number of text fragments among the subset of the one or more text fragments corresponding to each of the one or more wrapping regions that comprise bold text.

In some example embodiments, a high normalization ratio negatively impacts a corresponding tabular score, positively impacts a corresponding narrative score, and positively impacts a corresponding label score, wherein a high density ratio negatively impacts a corresponding tabular score, positively impacts a corresponding narrative score, and positively impacts a corresponding label score, wherein a high alignment ratio positively impacts a corresponding tabular score, and negatively impacts a corresponding narrative score, wherein a high capital or non-alphabetic ratio positively impacts a corresponding tabular score, and negatively impacts a corresponding narrative score, wherein a high text fragment quantity negatively impacts a corresponding label score, and wherein a high bold count positively impacts a corresponding label score.

In some example embodiments, the tabular score, the narrative score and the label score are values between 0.0 and 1.0, wherein if one of the one or more wrapping regions comprises only a single number fragment, the tabular score of the one of the one or more wrapping regions is 1.0, and wherein if one of the one or more wrapping regions comprises only a single text fragment, the label score of the one of the one or more wrapping regions is 1.0.

In some example embodiments, the generating the wrapping region group set comprises: adding, by the processor, each of the one or more wrapping regions to a corresponding one of the one or more wrapping region groups, wherein each of the one or more wrapping region groups comprises spatial coordinates indicating the positioning of the one or more wrapping region groups on the rendered page, and wherein each of the one or more wrapping region groups comprises a bounding box delineating outer borders of the corresponding wrapping region; adding, by the processor, the one or more wrapping region groups to a coordinate map based on the spatial coordinates of the one or more wrapping region groups; identifying, by the processor, among the one or more wrapping region groups, a current wrapping region group, the current wrapping region group being the tallest, uppermost, and leftmost wrapping region group, on the coordinate map, that comprises a tabular block type; identifying, by the processor, a current wrapping region rectangular area matching the dimensions and spatial position of the bounding box of the current wrapping region group; extending, by the processor, the left and right borders of the current wrapping region rectangular area to match the left and right borders of the coordinate map; identifying, by the processor, one or more intersecting wrapping region groups, among the one or more wrapping region groups, that comprise a bounding box intersecting the current wrapping region rectangular area; calculating, by the processor, for each of the one or more intersecting wrapping region groups, a corresponding intersecting wrapping region group merge score; merging, by the processor, with the current wrapping region group, each of the one or more intersecting wrapping region groups comprising an intersecting wrapping region group merge score higher than a predetermined intersecting wrapping region group merge threshold; removing, by the processor, the current wrapping region group, including the merged one or more intersecting wrapping region groups, from the coordinate map; and adding, by the processor, the current wrapping region group to the wrapping region group set.

In some example embodiments, each of the intersecting wrapping region group merge scores is calculated based on properties of the corresponding intersecting wrapping region group and the current wrapping region group, the properties being selected from the group consisting of (i) a vertical alignment, (ii) block type, and (iii) matching lines.

In some example embodiments, the generating the block set comprises: adding, by the processor, each of the one or more wrapping region groups to a corresponding one of the one or more blocks, wherein each of the one or more blocks comprises spatial coordinates indicating the positioning of the one or more blocks on the rendered page, and wherein each of the one or more blocks comprises a bounding box delineating outer borders of the corresponding wrapping region group; adding, by the processor, the one or more blocks to the coordinate map based on the spatial coordinates of the one or more blocks; identifying, by the processor, among the one or more blocks, a current block, the current block being the widest, uppermost and leftmost block on the coordinate map; identifying, by the processor, a current block rectangular area matching the dimensions and spatial position of the bounding box of the current block; extending, by the processor, the top and bottom boundaries of the current block rectangular area to match the top and bottom boundaries of the coordinate map; identifying, by the processor, one or more intersecting blocks, among the one or more blocks, that comprise a bounding box intersecting the current block rectangular area; calculating, by the processor, for each of the one or more intersecting blocks, a corresponding intersecting block merge score; merging, by the processor, with the current block, each of the one or more intersecting blocks comprising an intersecting block merge score higher than a predetermined intersecting block merge threshold; removing, by the processor, the current block, including the merged one or more intersecting blocks, from the coordinate map; and adding, by the processor, the current block to the block set.

In some example embodiments, each of the intersecting block merge scores is calculated based on properties of the corresponding intersecting block and the current block, the properties being selected from the group consisting of: (i) horizontal alignment, (ii) column position, (iii) column alignment, and (iv) column data type.

In some example embodiments, the print-ready digital source document is a fixed-layout file (e.g., PDF, XPS).

BRIEF DESCRIPTION OF THE DRAWINGS

The foregoing and other objects, aspects, features, and advantages of the present disclosure will become more apparent and better understood by referring to the following description taken in conjunction with the accompanying drawings.

FIG. 2A illustrates an interface for generating tables from print-ready digital source documents according to an exemplary embodiment.

FIG. 2B illustrates an interface for generating tables from print-ready digital source documents according to an exemplary embodiment.

FIG. 2C illustrates an interface for generating tables from print-ready digital source documents according to an exemplary embodiment.

FIG. 2D illustrates an interface for generating tables from print-ready digital source documents according to an exemplary embodiment.

FIG. 2E illustrates an interface for generating tables from print-ready digital source documents according to an exemplary embodiment.

FIG. 2G(II) illustrates a flow chart for executing a wrapping algorithm according to an exemplary embodiment.

FIG. 5A(II) illustrates a second part of a flow chart for executing a horizontal aggregation algorithm or a horizontal aggregation portion of an aggregation algorithm, according to an exemplary embodiment.

FIG. 5B (II) illustrates a second part of a flow chart for executing a vertical aggregation algorithm or a vertical aggregation portion of an aggregation algorithm, according to an exemplary embodiment.

FIG. 5F illustrates an interface for generating tables from print-ready digital source documents according to an exemplary embodiment.

FIG. 5G illustrates an interface for generating tables from print-ready digital source documents according to an exemplary embodiment.

DETAILED DESCRIPTION

Figure 1A:
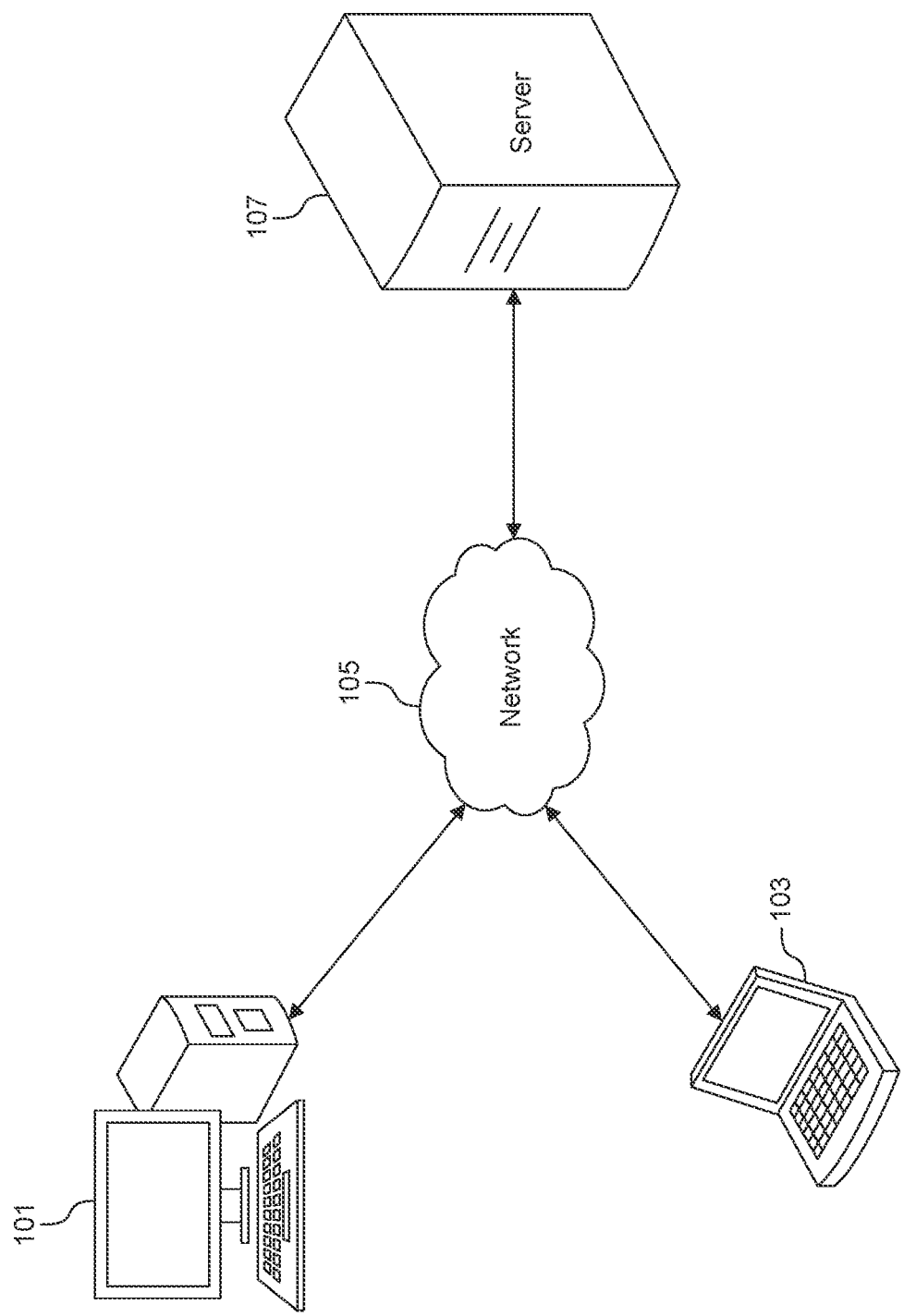
FIG. 1A is a diagram illustrating a system for generating tables from print-ready digital source documents, according to an exemplary embodiment.

It should be understood that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it should be understood that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing actions is immaterial so long as the invention remains operable. Moreover, two or more steps or actions may be conducted simultaneously.

The mention herein of any publication or patent application, for example, in the Background section, is not an admission that such publication or patent application constitutes prior art with respect to any of the claims or subject matter presented herein. The Background section is presented for purposes of clarity and is not intended to be a description of prior art with respect to any claim.

Definitions

In order for the present disclosure to be more readily understood, certain terms are first defined below. Additional definitions for the following terms and other terms are set forth throughout the specification.

"Digital published text source" or "print-ready digital source document": Any published text that is in digital form and expressed as a metalanguage, where the text content is accessible along with its spatial location on the rendered page.

"Rendered page": The print-ready form of a page, where text has been placed into the page's coordinate space along with associated attributes (e.g. font face, size, and style).

"Unicode": A universal character encoding standard for text stored in digital form.

"Whitespace": Any Unicode character that represents horizontal or vertical space when rendered.

"Spatial coordinates": The x and y locations used as a spatial reference points for text objects (e.g., characters, fragments) on a rendered page.

"Text fragment": A string of non-whitespace Unicode characters and associated spatial coordinates, which locate and/or identify the location of the fragment on the rendered page.

"Coordinate map": A collection of information (e.g., text fragments) that is indexed by its/their spatial coordinates, and ordered by its/their appearance on the rendered page, from top to bottom and left to right.

"Horizontal separation threshold": The maximum spatial distance allowed between horizontally adjacent text fragments, in order for them to be considered part of the same fragment run.

"Fragment run": A collection of horizontally adjacent text fragments whose horizontal separations fall within the horizontal separation threshold.

"Vertical separation threshold": The maximum distance allowed between the bottom of the bounding box of a wrapping region and the next vertically adjacent text fragment below, in order for the fragment to be considered part of the wrapping region.

"Wrapping region": A collection of vertically adjacent fragment runs whose vertical separations fall within the vertical separation threshold.

"Wrapping region collection": The set of all wrapping regions present on the rendered page.

"Bounding box": A rectangle expressed in spatial coordinates that is used to define the bounds and location of text fragments, fragment runs, wrapping regions, and the like on the rendered page.

"Current text fragment": The text fragment eligible for inclusion in a fragment run.

"Current fragment run": The fragment run eligible for inclusion in a wrapping region.

"Current wrapping region": The wrapping region eligible for inclusion in the wrapping region collection.

"Tabular data": A grouping of structured data in which text fragments can be arranged by rows and columns.

"Narrative data": A grouping of unstructured data that has no tabular format. Occurs, for example, in the form of sentences and paragraphs.

"Label data": A single text fragment or grouping of text fragments usually found above a section of narrative or tabular data. Label data gives context to related sections of text.

"Block type": The classification of tabular, narrative, or label, which can be applied to a wrapping region or any aggregation of wrapping regions.

"Type score": A decimal value (e.g., between 0.0 and 1.0) that is produced by calculating the weighted average of a collection of sub-scores. This score is used to determine how closely a region identifies as a tabular, narrative, or label block type.

"Sub-score": A fractional value (e.g., between 0.0 and 1.0) is multiplied by a predetermined weight to generate an associated score (e.g., type score, merge score).

"Normalized text fragment": A collection of text fragments that are horizontally separated by no more than the width of a predetermined number of characters (e.g., 3 characters). This width is determined based on the font attributes of the text fragments (e.g., font face, size, and style).

"Normalization ratio": The number of normalized text fragments divided by the total number of text fragments within a wrapping region.

"Density ratio": The percentage of a wrapping region's bounding box area occupied by text fragment bounding boxes.

"Alignment": Refers to the x-axis and/or y-axis value of the left edge, right edge, top edge, bottom edge, or center point of a bounding box and how it relates spatially to another bounding box. That is, alignment may refer to a horizontal or vertical relationship between two corresponding points of two bounding boxes.

"Alignment group": A collection of normalized text fragments whose bounding boxes are either left, right, or center aligned.

"Alignment ratio": The number of normalized text fragments that fit within at least one alignment group divided by the total number of normalized text fragments within a wrapping region.

"Bold count": The number of text fragments with bolded text.

"Capital or non-alphabetic ratio": The number of normalized text fragments that start with either a capital letter or a non-alphabetic character divided by the number of normalized text fragments.

"Wrapping region group": A collection of wrapping regions. In addition to containing wrapping regions, wrapping region groups also contain a collection of lines and a block type derived from its wrapping regions.

"Line": A collection of horizontally adjacent text fragments that are aligned relative to their font base line. Meant to represent a line of text or single row of data in a table as would appear on a printed page. Rendered pages do not inherently possess the concept of lines, because they are simply fragments of text with coordinate positions.

"Wrapping region group collection": The set of all wrapping region groups present on the rendered page.

"Block column": A specialized type of wrapping region group that contains metadata about the alignment (left, right, center), data type, and line structure of the wrapping regions it contains. The wrapping regions within a block column are arranged vertically.

"Block table": A collection of adjacent and non-overlapping block columns. The block type, in some example embodiments, is tabular. In addition to containing wrapping regions, block tables also contain a collection of block columns created by stripping the wrapping regions out of the wrapping region groups and arranging them into vertical groupings.

"Block table collection": The set of all block tables present on the rendered page.

"Merge score": A decimal value (e.g., between 0.0 and 1.0) produced by calculating the weighted average of a collection of sub-scores. This score is used to determine the strength of the spatial relationship between two regions.

"Merge threshold": A predetermined decimal value (e.g., between 0.0 and 1.0) that determines the point at which a merge score is high enough such that two wrapping region groups or block tables should be merged.

"Separation thresholds": The combination of space width threshold, line separation threshold, and line affinity ratio used by the wrapping algorithm to create wrapping regions.

"Space width threshold": A value (e.g., between 0.0 and 3.0) that represents the maximum amount of space that is allowed between two text fragments in order to join them into the same wrapping region. In some example embodiments, the space width threshold may have a default value (e.g., 2.5).

"Line separation threshold": A value (e.g., between 0.0 and 1.0) that represents the maximum amount of vertical space that is allowed between two lines in order to join them into the same wrapping region. In some example embodiments, the line separation threshold may have a default value (e.g., 0.5).

"Line affinity ratio": A value used to determine the maximum ratio of difference that can exist between the heights of two text fragments in order to join them into the same wrapping region. In some example embodiments, the line affinity ratio may have a default value (e.g., 0.3).

System

FIG. 1A is a diagram illustrating a system 100A for generating tables from print-ready digital source documents, according to an exemplary embodiment.

System 100 includes computing devices 101 and 103, which are connected to a server 107 via a network 105. The server 107 and the computing devices 101 and 103 may communicate over the network 105 using protocols such as Internet Protocol Suite (TCP/IP), HTTP, FTP, IMAP, Fibre Channel Protocol (FCP), Fibre Channel over Ethernet (FCoE), Internet SCSI (iSCSI), and the like.

In some example implementations, the computing devices 101 and 103 include laptops, desktop computers, smartphones, tablets, mobile devices, wearable devices, workstations, personal digital assistants, mainframes, and the like. The computing devices 101 and 103, and the server 107 each include software and hardware (e.g., at least one processor and at least one memory).

In some example embodiments, the computing devices 101 and 103 are used to generate tables from print-ready digital source documents such as XPS, RTF or PDF-type document and/or files. Generating tables is performed, for example, using a table-generating tool, application, or the like stored and/or executing on the computing devices 101 and/or 103. The table-generating tool, application or the like is programmed to execute various algorithms, including, for example, a wrapping algorithm, classification algorithm, aggregation algorithm, thresholding algorithm, and the like. Generating tables from print-ready digital source documents is explained in more detail below with reference to FIGS. 1B-5. Generally, a table refers to an arrangement of data into rows and columns, cells, fields, or the like.

In some example embodiments, the server 107 is a platform that provides the functionality of the table-generating tool, application or the like to the computing devices 101 and 103, for example, via the network 105. This functionality can be provided, for example, as part of a software-as-a-service (SaaS), platform-as-a-service (PaaS) or infrastructure-as-a-service (IaaS) offering or architecture. That is, the computing devices 101 and 103 may store, generate or transmit print-ready digital source documents to the server 107 for analysis and generation of tables. In other example embodiments, the print-ready digital source documents may be generated, transmitted for analysis, and/or used to create tables at the server 107 by the computing devices 101 and/or 103, via the network 105, and using an application (e.g., web browser application) executing on or accessible by the computing devices 101 and/or 103.

Process

Figure 1B:
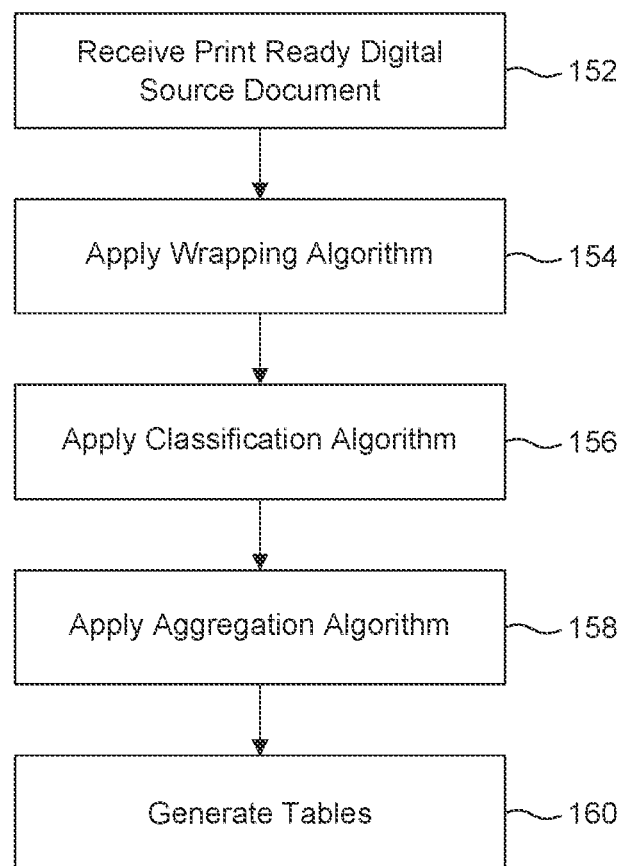
FIG. 1B illustrates a flow chart for generating tables from print-ready digital source documents according to an exemplary embodiment.

FIG. 1B illustrates a flow chart 100B for generating tables from print-ready digital source documents according to an exemplary embodiment. As shown in flow chart 100, at step 152, a print-ready digital source document is received by a computing device (e.g., client computing device, cloud computing device), for example, from a memory associated with (e.g., incorporated in, connected to, communicatively coupled to) the computing device or from another interconnected computing device. For example, the digital source document may be retrieved by the computing device in response to user instructions, or may be received when transmitted or pushed to it. As described above, a print-ready digital source document may be an XPS, RTF or PDF-type document, and includes one or more rendered pages.

In some example embodiments, the print-ready digital source document includes text with identifiable text characters and text fragments. As described above, a text fragment is a string of non-whitespace Unicode characters. Each text character and/or text fragment is associated with spatial coordinates (e.g., X,Y coordinates) identifying its corresponding location on a rendered page of the print-ready digital source document. In this way, each rendered page includes a coordinate map on which text fragments of the rendered page (collectively "text fragment collection") are indexed according to their spatial coordinates, from top to bottom and left to right (e.g., in the manner in which English language documents are typically read by humans). For example, the text fragment at the top left of the rendered page is assigned an index value i=0 The next text fragment to the right of the text fragment i=0 is assigned an index value i=1 or i+1. The last text fragment indexed is the text fragment at the bottom right portion of the rendered page.

In turn, at step 154, the computing device applies a wrapping algorithm to the text fragments of the rendered page to organize the text into spatial regions called "wrapping regions." That is, wrapping regions are identified and/or created. A group or set of wrapping regions on a rendered page are referred to as a "wrapping region collection." The wrapping region algorithm is described in further detail below with reference to FIGS. 2A-2G.

At step 156, the computing device applies a classification algorithm to wrapping regions such as the wrapping regions in a wrapping region collection. The classification algorithm assigns a type or block type to each of the wrapping regions. The type or block type identifies and/or indicates the type of data (e.g., text) with which the wrapping region is associated, including (1) tabular data, (2) narrative data, and (3) label data. In some example embodiments, the type or block type of each wrapping region is identified by calculating a tabular score, narrative score and label score and assigning the type based on the identified scores. In some example embodiments, the scores are calculated using various features and/or characteristics of the text or text fragments in the wrapping regions. The classification algorithm is described in further detail below with reference to FIGS. 4A and 4B.

At step 158, the computing device applies an aggregation algorithm to the wrapping regions such as the wrapping regions in a wrapping region collection. The aggregation algorithm identifies and/or combines wrapping regions that are spatially (e.g., horizontally and vertically) related to one another. In some example embodiments, the wrapping regions that are combined are wrapping regions that are on the same horizontal plane and/or vertical plane, on a rendered page, as a selected wrapping region. The aggregation algorithm aggregates wrapping regions into wrapping region groups and/or blocks. In some example embodiments, a merge score is calculated to determine whether two spatially related wrapping regions should be merged and/or combined. In some example embodiments, merge scores are calculated using features of the wrapping regions as well as characteristics of the relationship between multiple wrapping regions. The aggregation algorithm is described in further detail below with reference to FIGS. 5A-5G.

In turn, at step 160, tables are identified, generated and/or output. The tables include text from a rendered page of the print-ready digital source document. The tables include rows and columns. Each intersection of a row and column on the table is and/or corresponds to a cell or field of the table. In some example embodiments, each table corresponds to a block identified and/or generated using the aggregation algorithm. Each cell or field on the table includes a text fragment from a block of the rendered page on the print-ready digital source document.

Figure 2A:
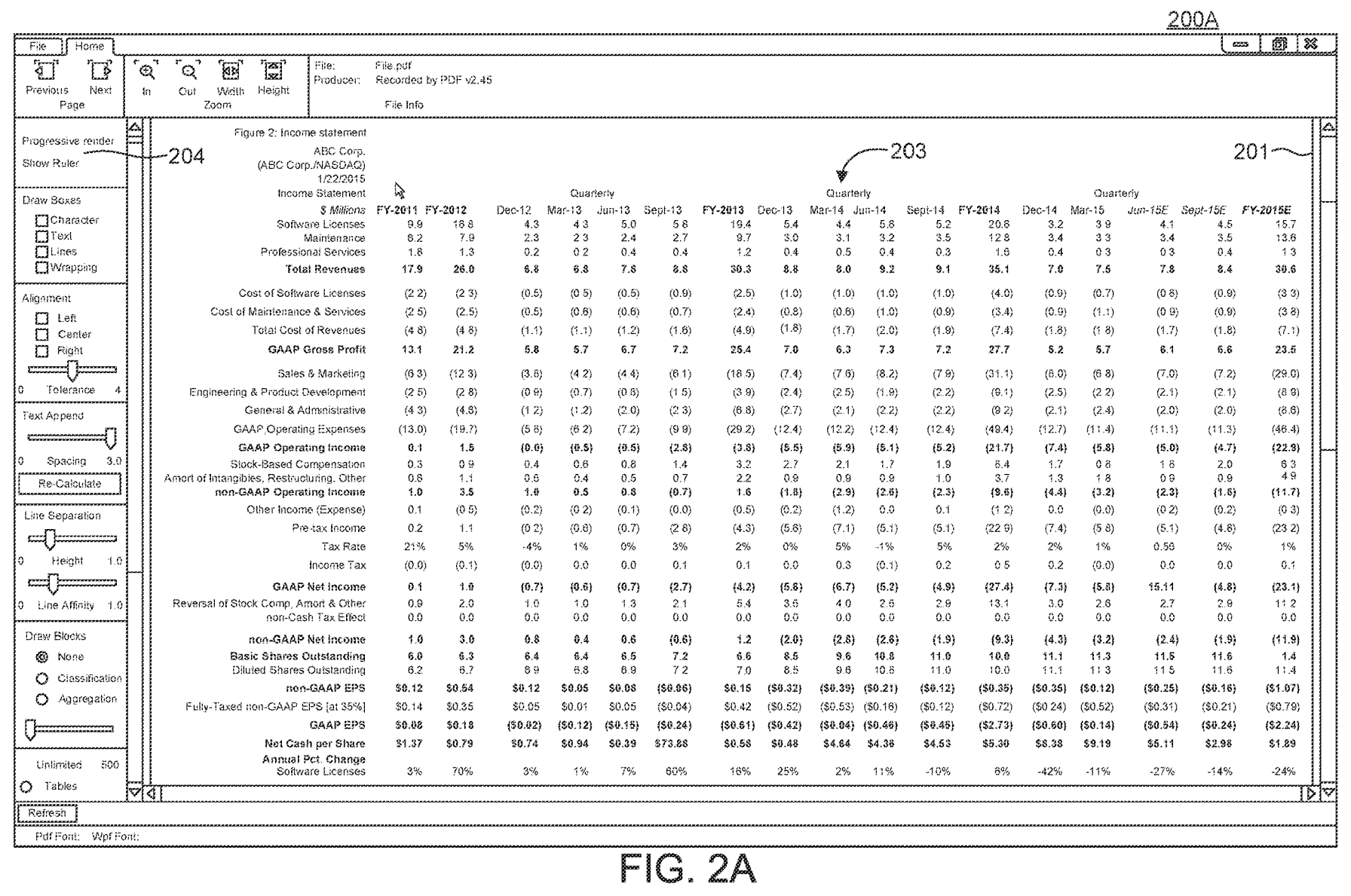

FIG. 2A illustrates an interface 200A for generating tables from print-ready digital source documents according to an exemplary embodiment. The interface 200A may be rendered, displayed and/or caused to be displayed via a graphical display (e.g., monitor, screen) of a computing device. The interface 200A includes a panel, section or area 201 in which text (and/or data) 203 of a print-ready digital source document is displayed. In some example embodiments, the text (and/or data) includes narrative data, tabular data and/or label data. Although the text (and/or data) 203 in FIG. 2A is an income statement including a large amount of tabular data, it should be understood that the print-ready digital source document may include various types of information distributed into any combination of types of data.

Interface 200A also includes a panel with input means such as checkboxes, slider bars, buttons, radial buttons, and the like, which are used to set, change and/or input information to be used in the execution of a wrapping algorithm, classification algorithm, aggregation algorithm, and/or separation threshold algorithm. For example, the input means may be for setting, changing and/or inputting information such as whether boxes should be displayed and/or drawn around characters, text fragments, lines, and/or wrapping regions; alignment of text (e.g., left, center right) and a corresponding tolerance; a tolerance slider bar for appending text fragments; slider bars for line separation, and the like. It should be understood that the input means, in some example embodiments, are not displayed in the interface 200A and the information is set, changed and/or input by an administrator.

When a document is opened, imported, retrieved and/or displayed in the interface 200A, various information is identified and/or calculated. For example, text and text fragments in the document are identified, spatial coordinates of the text fragments on the page are determined and/or calculated, and bounding boxes are identified and/or drawn for each text fragment. In some example embodiments, hovering a mouse, cursor or the like over a text fragment causes a bounding box to be displayed (e.g., temporarily, while mouse or cursor is hovered over the text fragment). A bounding box may be a solid-border box or the like (e.g., dotted rectangle, colored, etc.) that, among other things, identifies the outer boundaries of the text fragment.

Figure 2B:
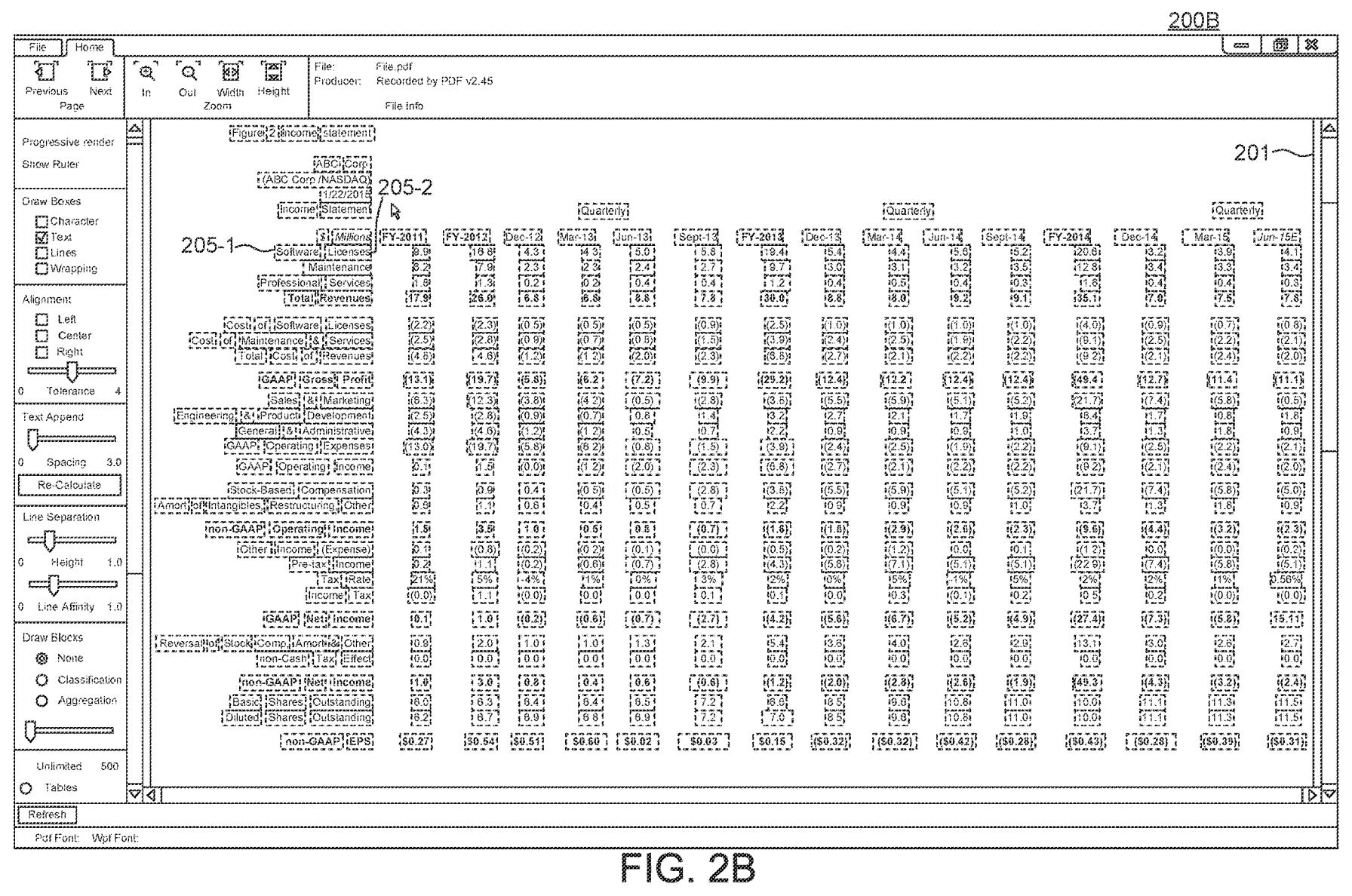

FIG. 2B illustrates an interface 200B for generating tables from print-ready digital source documents according to an exemplary embodiment. In FIG. 2B, the print-ready digital document has been opened, text fragments are identified, and bounding boxes for each text fragment are identified and drawn in the panel 201. As shown in FIG. 2B, each box and/or rectangle is and/or identifies a text fragment. For example, in FIG. 2B, two text fragments have been labeled as text fragment 205-1 ("Software") and text fragment 205-2 ("Licenses").

Wrapping Algorithm

As described above with reference to FIG. 1B, at step 154, a wrapping algorithm is applied to text fragments of or on a rendered page of a digital source document to organize the text and/or text fragments into spatial regions called "wrapping regions."

Figure 2C:
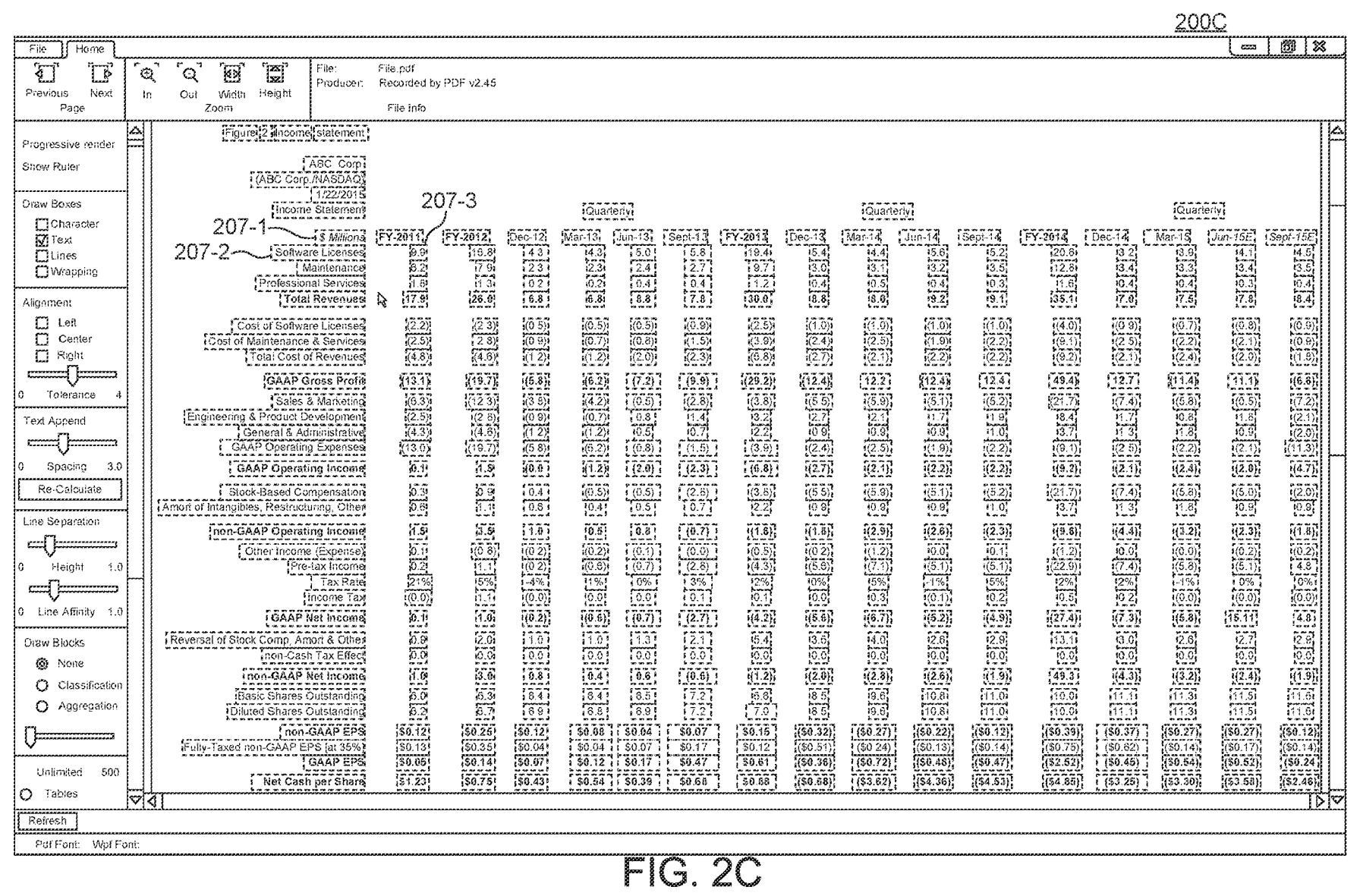
Figure 2D:
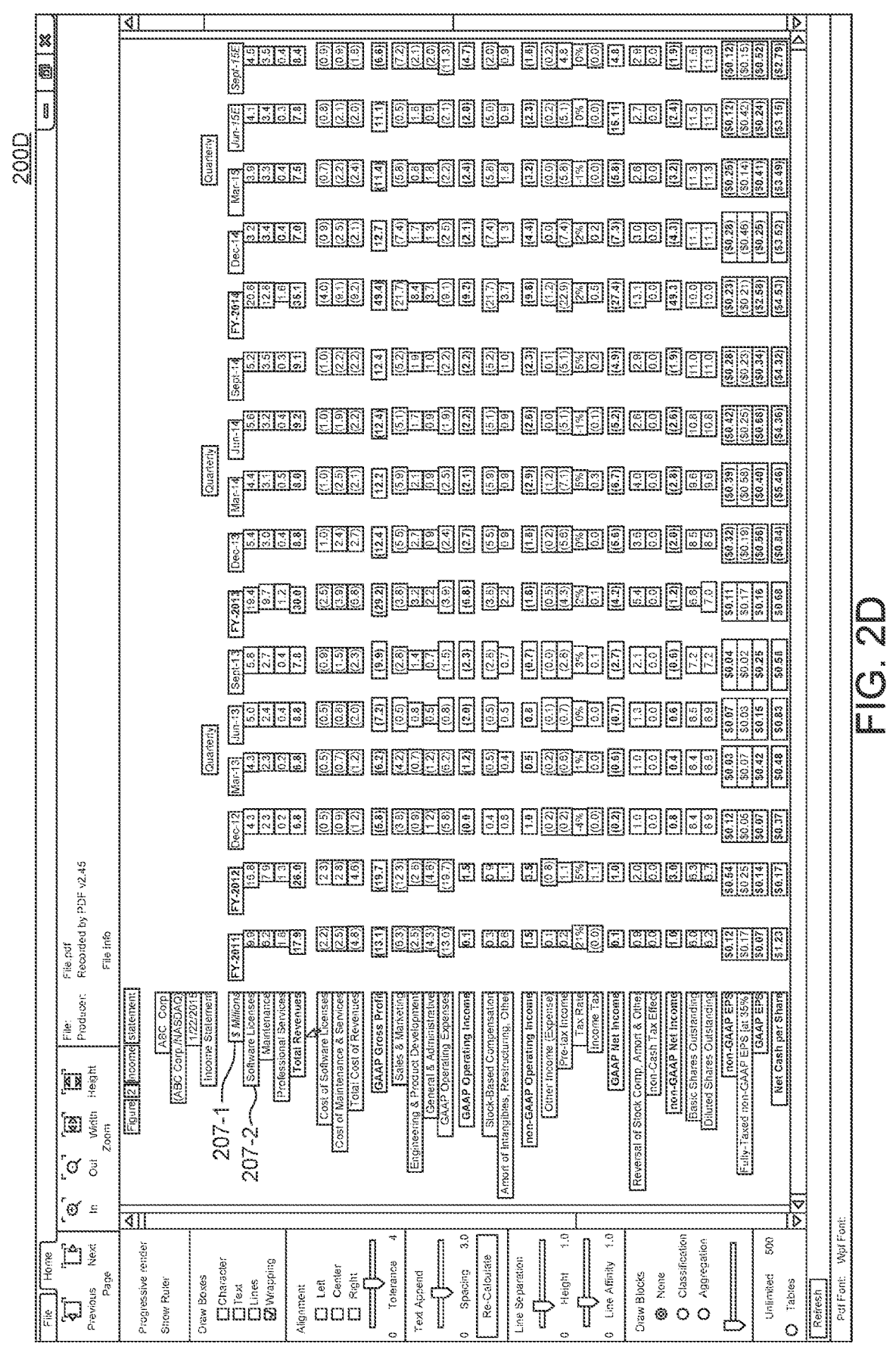
Figure 2E:
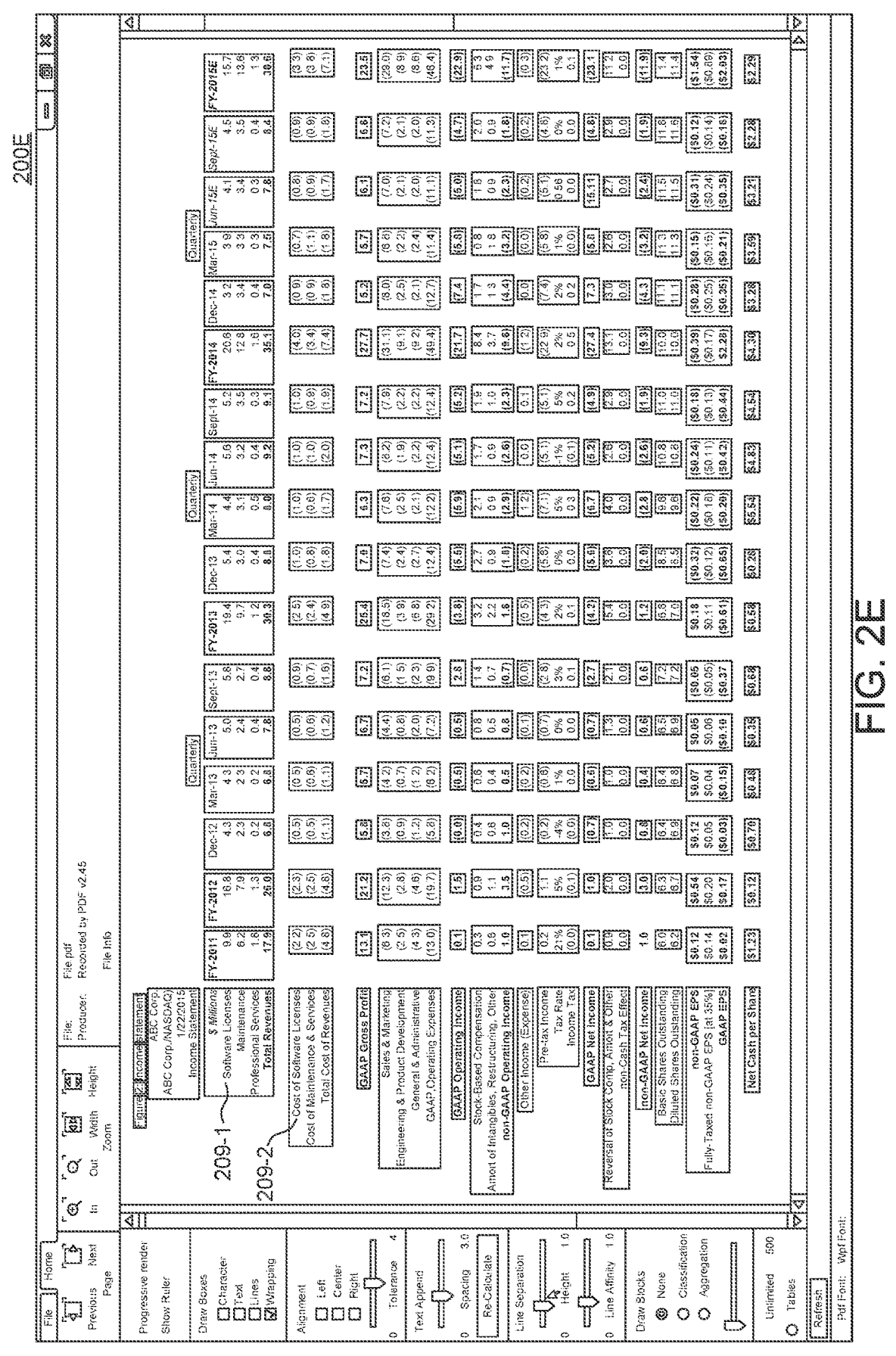
Figure 2F:
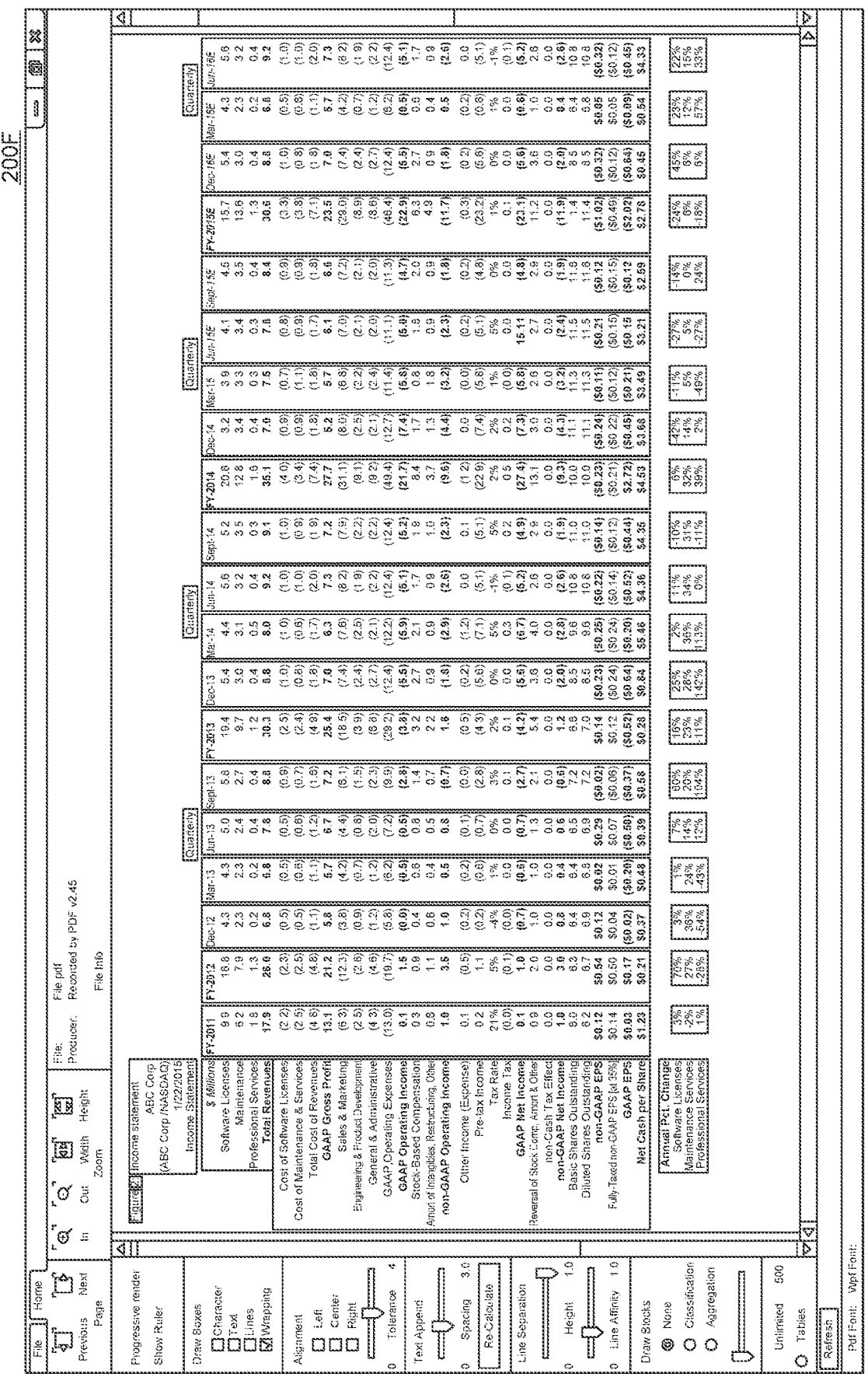
FIG. 2F illustrates wrapping regions that have been joined due to a higher vertical separation threshold, according to an exemplary embodiment.
Figure 2G:
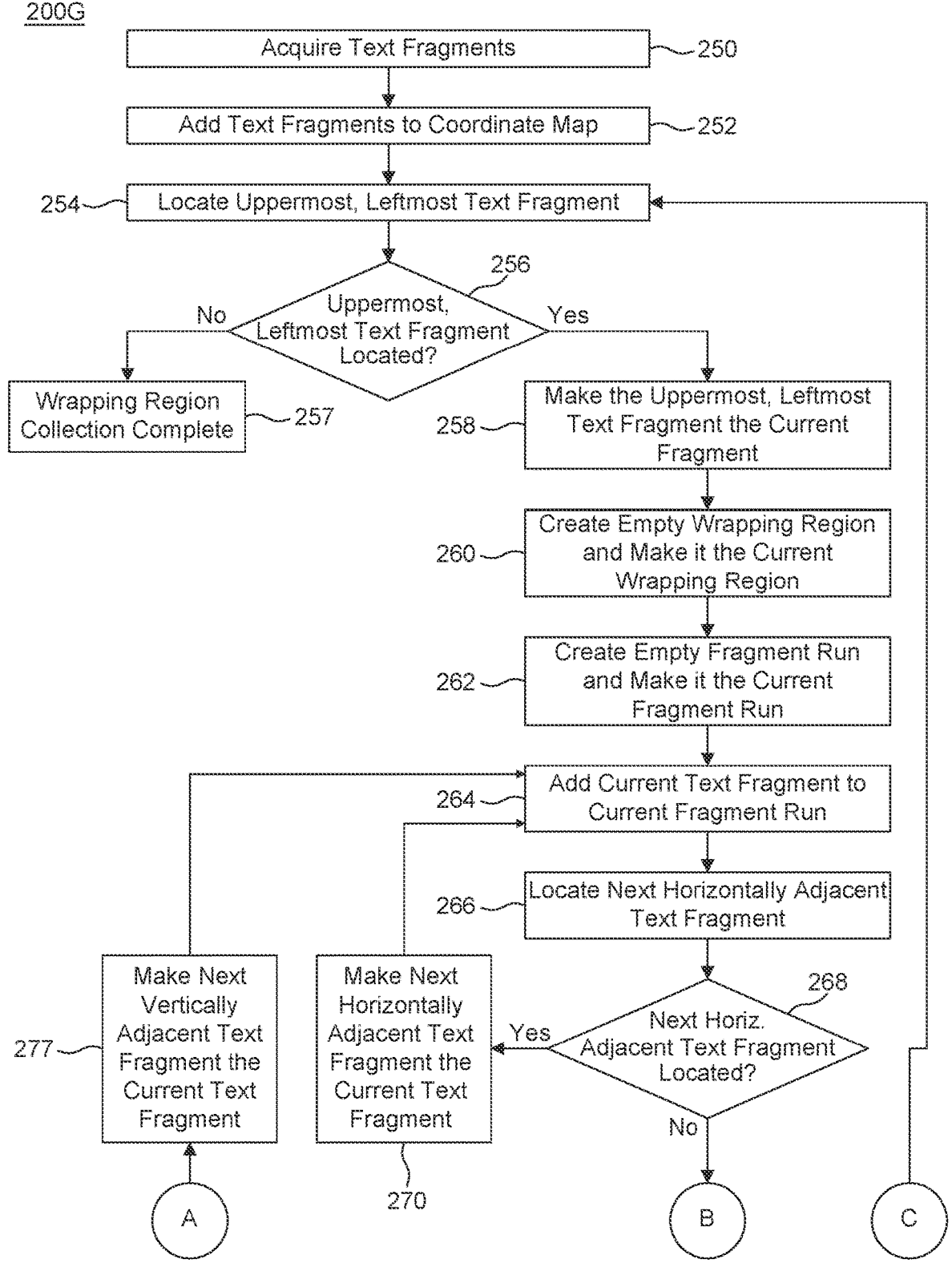
FIG. 2G(I) illustrates a flow chart for executing a wrapping algorithm according to an exemplary embodiment.

FIG. 2G illustrates a flow chart 200G for executing a wrapping algorithm according to an exemplary embodiment. At step 250, text fragments and their associated spatial coordinates are identified on a rendered page of a print-ready digital source document. In turn, at step 252, the identified text fragments are added to a coordinate map corresponding to the rendered page, based on the spatial coordinates of the text fragments. The text fragments are indexed according to their respective spatial coordinates, ordered by their appearance on the rendered page, from the top to bottom and left to right, such that a topmost and leftmost text fragment is the text fragment with the first index on the rendered page and the text fragment to its right is the text fragment with the second index on the rendered page. In this way, the text fragment with the last index on the rendered page is the bottommost and rightmost text fragment on the rendered page.

At step 254, the uppermost and leftmost text fragment on the coordinate map is located and/or identified. At step 256, a determination is made as to whether an uppermost and leftmost text fragment has been located on the coordinate map at step 254. That is, the determination at step 256 identifies whether any text fragments remain to be processed. If it is determined at step 256 that an uppermost and leftmost text fragment was not located and/or identified at step 254, the wrapping algorithm concludes and/or determines, at step 257, that the wrapping region collection is complete (e.g., that all text fragments on the rendered page have been assigned to wrapping regions).

On the other hand, if it is determined at step 256 that an uppermost and leftmost text fragment was indeed located and/or identified at step 254, that text fragment (e.g., the uppermost and leftmost text fragment located at step 254) is labeled, assigned, marked and/or flagged as the current text fragment at step 258. In turn, at step 260, an empty wrapping region is created and/or generated, and is also labeled, assigned, marked, and/or flagged as the current wrapping region. At step 262, an empty fragment run is created and/or generated, and is also labeled, assigned, marked and/or flagged as the current fragment run.

At step 264, the current text fragment (e.g., the text fragment located at step 254 and labeled as the current text fragment at step 258) is added and/or appended to the current fragment run (e.g., the fragment run created at step 262).

In turn, at step 266, a next horizontally adjacent text fragment, relative to the current text fragment, is located and/or identified. More specifically, moving from left to right on the x-axis, starting at the right edge of the current text fragment (e.g., the right edge of the current text fragment's bounding box), the wrapping algorithm searches for a text fragment that is within a predetermined horizontal separation threshold. The horizontal separation threshold is described in further detail below with reference to FIG. 3. The horizontal separation threshold is or represents a distance within which two text fragments must be located to be considered to be horizontally adjacent to one another. A higher horizontal separation threshold allows for more distant text fragments to be deemed to be horizontally adjacent to one another, as compared with a lower horizontal separation threshold.

At step 268, a determination is made as to whether a next horizontally adjacent text fragment (e.g., a text fragment within the horizontal separation threshold of the current text fragment) was located and/or identified at step 266. If it is determined at step 268 that a next horizontally adjacent text fragment was indeed located at step 266, that next horizontally adjacent text fragment is labeled, assigned, marked and/or flagged as the current text fragment at step 270, thereby replacing the previously identified current text fragment.

In turn, the wrapping algorithm proceeds at step 264 but with a new text fragment (e.g., the text fragment located at step 266) as the current text fragment. That is, the current text fragment identified at step 266 and labeled as such at step 270 is added to the current fragment run at step 264. The wrapping algorithm repeats steps 264, 266, 268 and 270 for as long as horizontally adjacent text fragments are identified and, those identified horizontally adjacent text fragments are added to or appended to the current text fragment run. In this way, the resulting current text fragment run is a set of horizontally adjacent text fragments that are within the horizontal separation threshold.

FIG. 2C illustrates an interface 200C for generating tables from print-ready digital source documents according to an exemplary embodiment. FIG. 2C includes text fragment runs identified and/or highlighted by a corresponding bounding box or the like. For example, in FIG. 2C, two text fragment runs have been labeled as text fragment run 207-1 ("$ Millions"), 207-2 ("Software Licenses"), and 207-3 ("9.9"). That is, in FIG. 2C the individual text fragments 205-1 and 205-2 of FIG. 2B, which have been determined to be within a horizontal separation threshold and are therefore deemed to be horizontally adjacent, are combined to form a fragment run 207-2. As can be seen in FIG. 2C, text fragment "Software License" and "9.9", which are on the same horizontal X-axis as one another, have not been combined into a single fragment run because they are sufficiently separated from one another and therefore outside or beyond the horizontal separation threshold.

FIG. 2D illustrates an interface 200D for generating tables from print-ready digital source documents according to an exemplary embodiment. In FIG. 2D, fragment runs are identified by shaded boxes as opposed to the outlined/bordered boxes of FIG. 2C.

Still with reference to FIG. 2G, if it is determined at step 268 that a next horizontally adjacent text fragment was not located at step 266, the current text fragment run is added and/or appended to the end of the current wrapping region, and the contents of the current text fragment are removed at step 272. This causes the current text fragment to be empty after step 272. In turn, at step 274, a next vertically adjacent text fragment, relative to the current wrapping region, is located and/or identified. More specifically, moving downwards (e.g., from top to bottom) on the Y-axis, starting at the bottom edge of the current wrapping region, the wrapping algorithm searches for the leftmost text fragment that is within a predetermined vertical separation threshold and, in some example embodiments, within the horizontal bounds of a bounding box of the current wrapping region. The vertical separation threshold is described in further detail below with reference to FIG. 3. The vertical separation threshold is or represents a distance within which a wrapping region and a text fragment must be located to be considered to be vertically adjacent to one another. A higher vertical separation threshold allows for a more distant text fragment to be deemed to be vertically adjacent to a wrapping region, compared with a lower vertical separation threshold. FIG. 2F illustrates wrapping regions that have been joined due to a higher vertical separation threshold as compared with FIG. 2E, according to an exemplary embodiment.

At step 276, a determination is made as to whether a next vertically adjacent text fragment (e.g., a text fragment within the vertical separation threshold of the current wrapping region) was located and/or identified at step 274. If it is determined at step 276 that a next vertically adjacent text fragment was indeed located at step 274, the next vertically adjacent text fragment is labeled, assigned, marked and/or flagged as the current text fragment at step 277, thereby replacing the previous current text fragment.

In turn, the wrapping algorithm proceeds at step 264 but with a new text fragment (e.g., the text fragment located at step 274) as the current text fragment. That is, the current text fragment identified at step 274 and labeled as such at step 277 is added to the current fragment run at step 264. The wrapping algorithm repeats steps 264, 266, 268 and 270 for as long as horizontally adjacent text fragments are identified and, those identified horizontally adjacent text fragments are added to or appended to the current text fragment run. In this way, the resulting current text fragment run is a set of horizontally adjacent text fragments that are within the horizontal separation threshold.

FIG. 2E illustrates an interface 200E for generating tables from print-ready digital source documents according to an exemplary embodiment. FIG. 2E includes wrapping regions that are identified and/or highlighted by a corresponding bounding box or the like. For example, in FIG. 2E, two text fragment runs have been labeled as text fragment run 209-1 and 209-2. That is, in FIG. 2E the individual text fragments 205-1 and 205-2 of FIG. 2B and/or the text fragment runs 207-1, 207-2 and 207-3 of FIG. 2C, which have been determined to be within a vertical separation threshold and are therefore deemed to be vertically adjacent, are combined into respective wrapping regions. As can be seen in FIG. 2E, text fragment run 207-1 and 207-2 of FIG. 2C, which are on the same vertical y-axis as one another and within the vertical separation threshold, are part of the wrapping region 209-1.

Still with reference to FIG. 2G, if it is determined at step 276 that a next vertically adjacent text fragment was not located at step 274, the current wrapping region is added and/or appended to the wrapping region collection at step 278. The text fragments in the current wrapping region are removed from the coordinate map of the rendered page at step 280.

In turn, the wrapping algorithm proceeds back to step 254, in which an uppermost and leftmost text fragment is located and/or identified in the coordinate map. In each subsequent iteration, the uppermost and leftmost text fragment located at step 254 is different because text fragments have been removed from the coordinate map at step 280. The algorithm continues to be executed until the wrapping region collection is complete, at step 257.

Separation Threshold Algorithm

Figure 3I:
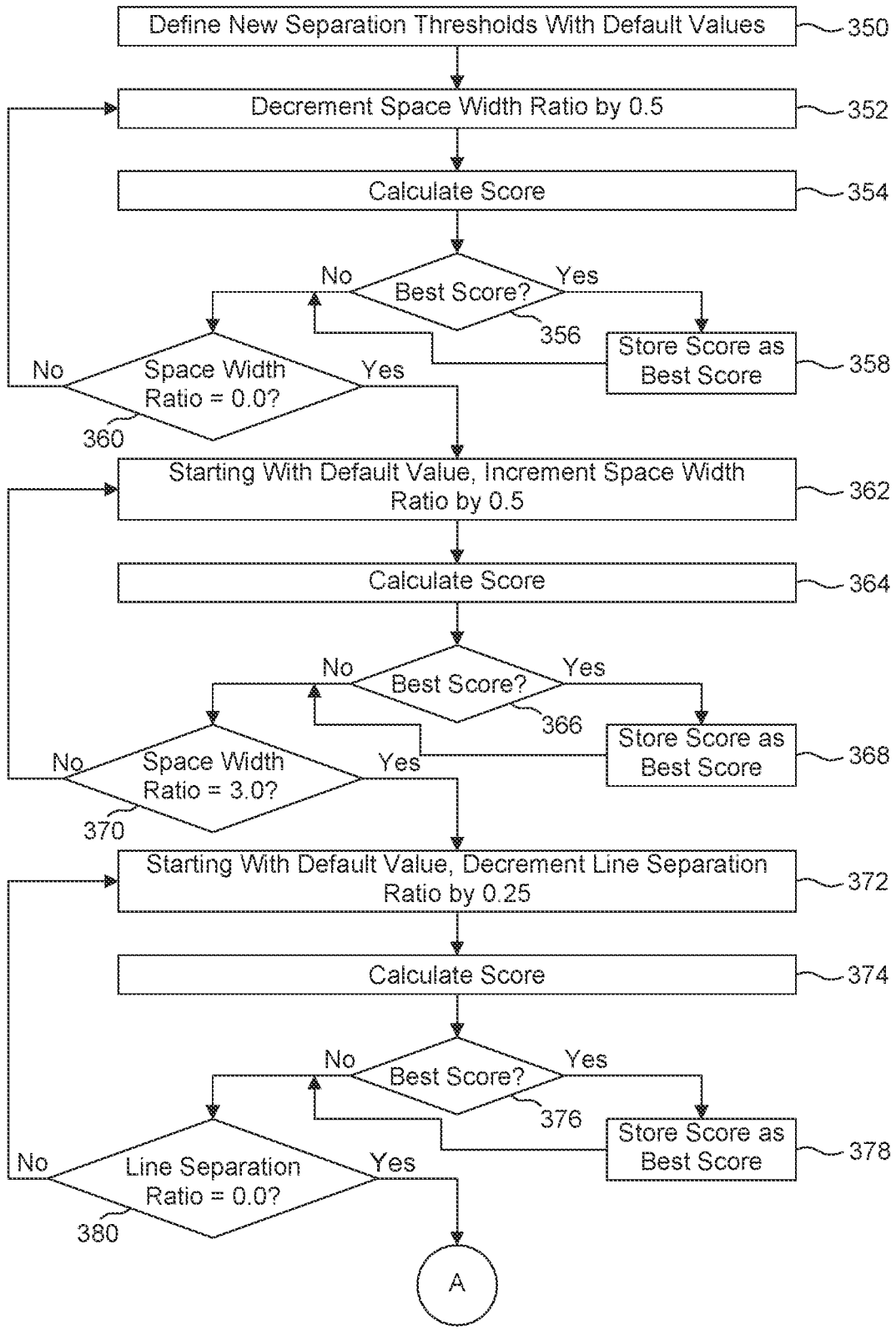
FIG. 3(I) illustrates a first part of a flow chart for identifying optimal separation thresholds according to an exemplary embodiment.
Figure 3:
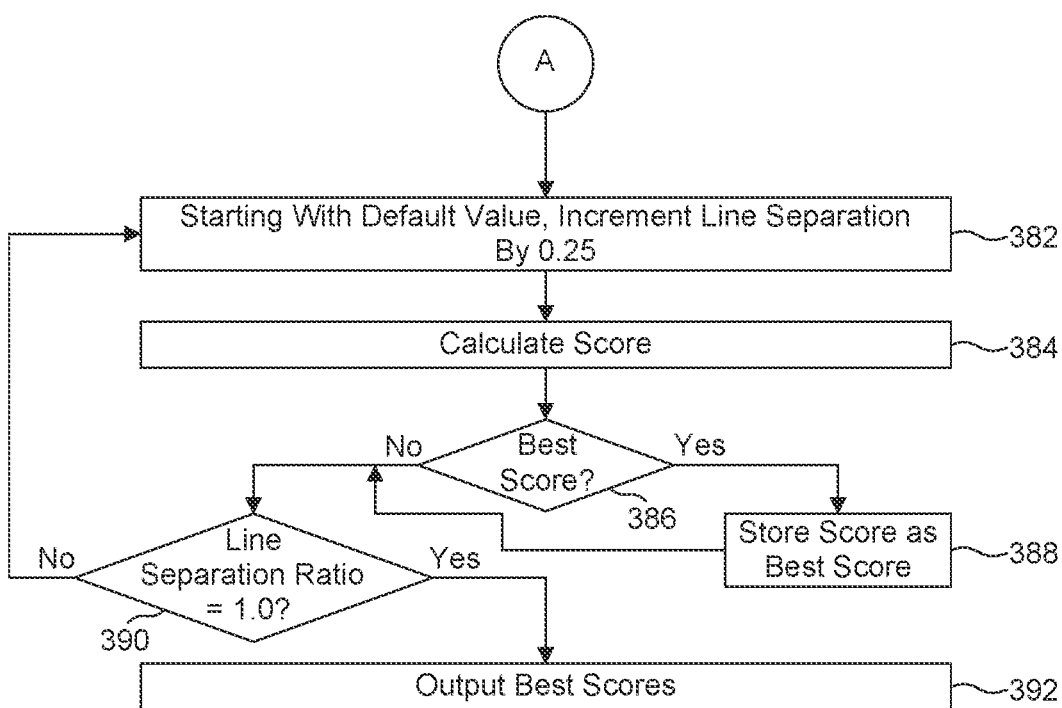
FIG. 3(II) illustrates a second part of a flow chart for identifying optimal separation thresholds according to an exemplary embodiment.

FIG. 3 illustrates a flow chart 300 for identifying optimal separation thresholds according to an exemplary embodiment. As described above, horizontal and/or vertical separation thresholds are used during the execution of a wrapping algorithm to identify text fragments that are horizontally and/or vertically adjacent, respectively, and can therefore be joined into fragment runs and/or wrapping regions.

At step 350, a new set of separation thresholds is defined with default space width thresholds and line separation threshold values. In some example embodiments, the default space width threshold and line separation threshold values are multiples of a predetermined value (e.g., 0.25, 0.5). It should be understood that multiples provided herein are exemplary, and the predetermined multiple may be any value that functions with the algorithms described herein. The set of separation thresholds may include a horizontal separation threshold and a vertical separation threshold. The horizontal separation threshold is associated with a space width threshold that is or represents the maximum amount of horizontal space on a rendered page that is allowed between two text fragments in order to join the text fragments into the same fragment run and/or wrapping region. In some example embodiments, the default space width threshold defined at step 350 is a predetermined default value (e.g., 2.5). It should be understood that default values provided herein are exemplary, and the default values can be any value that functions with the algorithms described herein. The vertical separation threshold is associated with a line separation threshold that is or represents the maximum amount of vertical space on a rendered page that is allowed between two lines (e.g. text fragments, fragment runs) in order to join them into the same wrapping region. In some example embodiments, the default line separation threshold defined at step 350 is a predetermined default value (e.g., 0.5). It should be understood that default values provided herein are exemplary, and the default values can be any value that functions with the algorithms described herein.

In turn, at step 352, the space width threshold of the horizontal separation threshold is decremented by a predetermined value (e.g., 0.5 (e.g., starting with the default value (e.g., 2.5) in the first iteration)). At step 354, a score is calculated for the horizontal separation threshold. Calculating and/or computing a score (e.g., steps 354, 364, 374, 384) is performed based on one or more sub-scores calculated for the following metrics:

Wrapping region overlap: High numbers of overlaps between wrapping regions produced by a set of separation thresholds negatively impacts the score for those thresholds.

Single-line regions: High numbers of single-line wrapping regions produced by a set of separation thresholds negatively impacts the score for those thresholds.

Multi-line regions: High numbers of multi-line wrapping regions that do not have any overlaps produced by a set of separation thresholds positively impacts the score for those thresholds.

In some example embodiments, calculating a sub-score for a wrapping region overlap metric includes counting and/or calculating the number of overlaps between wrapping regions on the rendered (e.g., current) page. The overlaps may be a space where the bounding boxes of two wrapping regions intersect). In turn, the calculated count is divided by the number of text fragments on the rendered page to obtain a value (e.g., between 0.0 and 1.0). This obtained value is subtracted from 1.0. In turn, the resulting value is multiplied by a predetermined weight (e.g., 3) to produce a corresponding sub-score.

In some example embodiments, calculating a sub-score for a multi-line region metric includes initializing a score (e.g., to 0.0). In turn, the wrapping regions on the rendered page that (1) consist of more than one fragment run (e.g., series of text fragments that can be considered to be on the same line), and (2) that do not intersect with other wrapping regions, are identified and/or located. For each such identified wrapping region, add to the score the number of text fragments in each wrapping region divided by the number of text fragments on the page (i.e., score=score+(fragments_in_each_region/fragments_on_page)). In turn, the resulting score is divided by the number of text fragments on the page. The resulting value is multiplied by a predetermined weight (e.g., 1) to produce a corresponding sub-score.

In some example embodiments, calculating a sub-score for a single line regions metric includes counting and/or calculating the number of wrapping regions on the rendered page that consist of only one fragment run. This count is divided by the number of text fragments on the current page to obtain a value (e.g., between 0.0 and 1.0). This obtained value is subtracted from 1.0. In turn, the resulting value is multiplied by a predetermined weight (e.g., 1) to produce a corresponding sub-score.

It should be understood that the values described in connection with calculating the sub-scores are part of an exemplary embodiment, and other values may be used in accordance with the algorithms described herein.

Still with reference to step 354, in some example embodiments, the score (e.g., block score) is a weighted average of the sub-scores. For example, sub-scores may be combined (e.g., to create a score) by taking the sum of the sub-scores to be combined and dividing that sum by the sum of the weights for the sub-scores (e.g., 3, 1, 1), to produce a value (e.g., score) between 1.0 and 0.0.

At step 356, the calculated score is analyzed to determine whether it is the best score calculated during the decrementing of the space width threshold. If it is determined at step 356 that the score calculated at step 354 is the best score, that score is stored and/or marked, at step 358, as the best score of the space width threshold decrementing process. In some example embodiments, a best score is a highest score. On the other hand, if it is determined at step 356 that the score calculated at step 354 is not the best score, or once the best score has been stored at step 358, the separation threshold algorithm determines, at step 360, whether the space width threshold is equal to a predetermined minimum value (e.g., 0.0) (e.g., whether the space width threshold decrementing process has reached an end).

If it is determined at step 360 that the space width threshold is not equal to the predetermined minimum value (e.g., 0.0), the separation threshold algorithm returns to step 352, where the space width threshold is decreased by a predetermined multiple or amount (e.g., 0.5), and steps 354, 356, 358, and 360 are repeated until the space width threshold has been decremented to the predetermined minimum value (e.g., 0.0). Thus, each time the space width threshold is decremented (e.g., by 0.5), a score is calculated and that score is analyzed to determine whether it is the best score (e.g., by comparing the newly calculated score to the best score). If the newly-calculated score is better than the best score, the best score is replaced with the newly calculated score. At the end of the process, the best score during the decrementing of the space width threshold is stored and made accessible.

In turn, at step 360, if it is determined that the space width threshold is equal to the predetermined minimum value (e.g., 0.0), the separation threshold algorithm proceeds to a process of incrementing the space width threshold. That is, at step 362, the space width threshold of the horizontal separation threshold is incremented by a predetermined multiple or amount (e.g., 0.5) (e.g., starting with the default value (e.g., of 2.5) in the first iteration). At step 364, a score is calculated for the horizontal separation threshold. Calculating and/or computing a score is done based on one or more of the metrics discussed above in connection with step 354.

At step 366, the calculated score is analyzed to determine whether it is the best (e.g., highest) score calculated during the incrementing of the space width threshold. If it is determined at step 366 that the score calculated at step 364 is the best score, that score is stored and/or marked, at step 368, as the best score of the space width threshold incrementing. On the other hand, if it is determined at step 366 that the score calculated at step 364 is not the best score, or once the best score has been stored at step 368, the separation threshold algorithm determines, at step 370, whether the space width threshold is equal to the predetermined maximum value (e.g., 3.0) (e.g., whether the space width threshold incrementing process has reached an end).

If it is determined at step 370 that the space width threshold is not equal to a maximum predetermined value (e.g., 3.0), the separation threshold algorithm returns to step 362, where the space width threshold is increased by a predetermined multiple or amount (e.g., 0.5), and steps 364, 366, 368, and 370 are repeated until the space width threshold has been incremented to the predetermined maximum value (e.g., 3.0). Thus, each time the space width threshold is incremented (e.g., by 0.5), a score is calculated and that score is analyzed to determine whether it is the best score of the process of incrementing the space width threshold (e.g., by comparing the newly calculated score to the best score). If the newly-calculated score is better than the best score, the best score of the process of incrementing the space width threshold is replaced with the newly calculated score. At the end of the process, the best (e.g., highest) score during the incrementing of the space width threshold is stored and made accessible.

In turn, at step 372, a process of decrementing the line separation threshold of the vertical separation threshold is initiated. More specifically, at step 372, the line separation threshold is decremented by a predetermined multiple or amount (e.g., 0.25) (e.g., starting with the default value (e.g., of 0.5) in the first iteration). At step 374, a score is calculated for the vertical separation threshold. Calculating and/or computing a score is done based on the metrics described above in connection with step 354.

At step 376, the calculated score is analyzed to determine whether it is the best score calculated during the decrementing of the line separation threshold. If it is determined at step 376 that the score calculated at step 374 is the best score of the process of decrementing the line separation threshold, that score is stored and/or marked, at step 378, as the best score of the line separation threshold decrementing. On the other hand, if it is determined at step 376 that the score calculated at step 374 is not the best score, or if the score is stored as the best score in step 378, the separation threshold algorithm determines, at step 380, whether the line separation threshold is equal to a predetermined minimum value (e.g., 0.0) (e.g., whether the line separation decrementing process has reached an end).

If it is determined at step 380 that the line separation threshold is not equal to 0.0, the separation threshold algorithm returns to step 372, where the line separation threshold is decreased by a predetermined multiple or amount (e.g., 0.25), and steps 374, 376, 378, and 380 are repeated until the line separation threshold has been decremented to the predetermined minimum value (e.g., 0.0.) Thus, each time the line separation threshold is decremented (e.g., by 0.25), a score is calculated and that score is analyzed to determine whether it is the best score (e.g., by comparing the newly calculated score to the best score). If the newly-calculated score is better than the best (e.g., highest) score, the best score is replaced with the newly calculated score. At the end of the process, the best score during the decrementing of the line separation threshold is stored and made accessible.

In turn, at step 380, if it is determined that the line separation threshold is equal to the predetermined minimum value (e.g., 0.0), the separation threshold algorithm proceeds to a process of incrementing the line separation threshold. That is, at step 382, the line separation threshold of the vertical separation threshold is incremented by a predetermined multiple or amount (e.g., 0.25) (e.g., starting with the default value (e.g., of 0.5) in the first iteration). At step 384, a score is calculated for the vertical separation threshold.

Calculating and/or computing a score is done based on one or more of the metrics discussed above in connection with step 354.

At step 386, the calculated score is analyzed to determine whether it is the best (e.g., highest) score calculated during the incrementing of the line separation threshold. If it is determined at step 386 that the score calculated at step 384 is the best score, that score is stored and/or marked, at step 388, as the best score of the line separation threshold incrementing. On the other hand, if it is determined at step 386 that the score calculated at step 384 is not the best score, or once the best score has been stored at step 388, the separation threshold algorithm determines, at step 390, whether the line separation threshold is equal to a predetermined maximum value (e.g., 1.0) (e.g., whether the line separation threshold incrementing process has reached an end).

If it is determined at step 390 that the line separation threshold is not equal to the predetermined maximum value (e.g., 1.0), the separation threshold algorithm returns to step 382, where the line separation threshold is increased by a predetermined multiple or amount (e.g., 0.25), and steps 384, 386, 388, and 390 are repeated until the line separation threshold has been incremented to the predetermined maximum value (e.g., 1.0). Thus, each time the line separation threshold is incremented (e.g., by 0.25), a score is calculated and that score is analyzed to determine whether it is the best (e.g., highest) score of the process of incrementing the line separation threshold (e.g., by comparing the newly calculated score to the best score). If the newly-calculated score is better than the best score, the best score of the process of incrementing the line separation threshold is replaced with the newly calculated score. At the end of the process, the best score during the incrementing of the line separation threshold is stored and made accessible.

In turn, at step 392, the best score of each of the space width threshold decrementing and incrementing processes, and the best score of each of the line separation threshold incrementing process are identified, output, made accessible, or the like.

It should be understood that the default values described above in connection with FIG. 3 correspond to an exemplary embodiment, and therefore any default values can be used. Likewise, values by which the space width threshold and line separation threshold are decremented and incremented, as well as the lowermost and uppermost cutoff values used during the decrementing and incrementing of the space width threshold and line separation threshold may vary.

Classification Algorithm

Figure 4A:
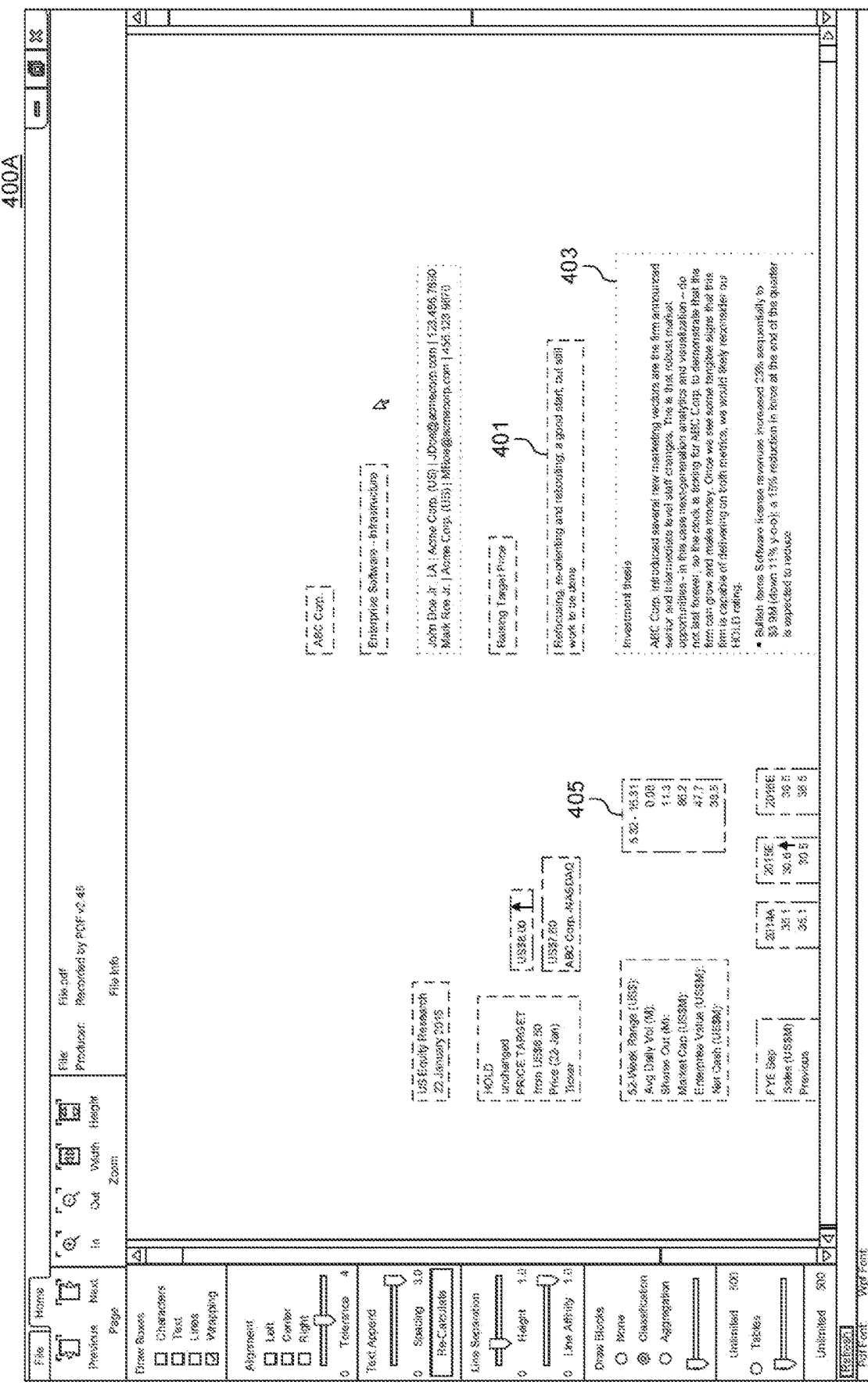
FIG. 4A illustrates an interface for generating tables from print-ready digital source documents according to an exemplary embodiment.

FIG. 4A illustrates an interface 400A for generating tables from print-ready digital source documents according to an exemplary embodiment. In FIG. 4A, the interface 400A includes and/or displays various text and/or data, each of which is assigned a block type using a classification algorithm described in further detail below with reference to FIG. 4B. That is, in some example implementations, the text and/or data is organized into wrapping regions, and each wrapping region is assigned a block type such as narrative data, tabular data or label data using the classification algorithm. Once each wrapping region has been categorized and/or assigned a block type, boxes, highlighting or the like of different colors, shading, border type and the like are used to visually indicate each wrapping region's corresponding block type.

For example, as shown in FIG. 4A, wrapping region 401 (and other wrapping regions with the same border (e.g., dashed, dotted, dashed-dotted)) is a wrapping region of block type label, indicating that the wrapping region includes label data; wrapping region 403 (and other wrapping regions with the same border) is a wrapping region of block type narrative, indicating that the wrapping region includes narrative data; and wrapping region 405 (and other wrapping regions with the same border) is a wrapping region of block type tabular, indicating that the wrapping region includes tabular data.

Figure 4B:
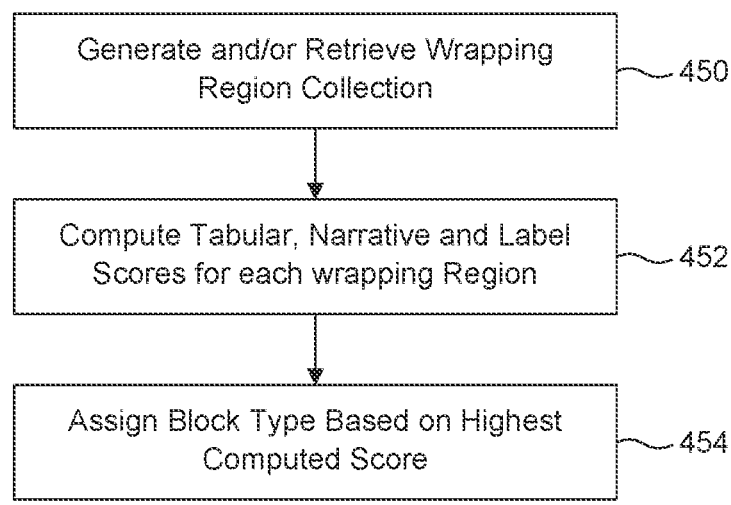
FIG. 4B illustrates a flow chart for executing a classification algorithm, according to an exemplary embodiment.

FIG. 4B illustrates a flow chart 400B for executing a classification algorithm, according to an exemplary embodiment. As shown in FIG. 4B, at step 450, a wrapping region collection including one or more wrapping regions is retrieved and/or generated (e.g., in accordance with the process described above in connection with FIG. 2G). In some example embodiments, the wrapping region collection includes wrapping regions corresponding to a rendered page of a digital-source document. Each wrapping region in the wrapping region collection includes vertically adjacent fragment runs, each of which includes one or more text fragments.

In turn, at step 452, for each of the wrapping regions in the wrapping region collection, a tabular score, a narrative score and a label score is calculated. The calculated scores are used to determine the block type corresponding to the wrapping region. In some example embodiments, the metrics and ratios described below (and which are also described in further detail above in the "Definitions" section) are calculated and used to compute sub-scores and, in turn, type scores (e.g., scores).

To produce a tabular sub-score for a wrapping region, the following metrics and/or ratios are first calculated:

Normalization ratio: A high degree of normalized fragments in the wrapping region has a negative impact on its tabular score.

Density ratio: A high fragment density value in the wrapping region has a negative impact on its tabular score.

Alignment ratio: A high degree of aligned (e.g., right, left, center) text fragments in a wrapping region has a positive impact on its tabular score.

Capital or non-alphabetic ratio: A high degree of normalized text fragments that begin with either a capital letter or non-alphabetic character in a wrapping region has a positive impact on its tabular score.

To produce a narrative sub-score for a wrapping region, the following metrics and/or ratios are first calculated:

Normalization ratio: A high degree of normalized fragments in the wrapping region has a positive impact on its narrative score.

Density ratio: A high fragment density value in the wrapping region has a positive impact on its narrative score.

Alignment ratio: A high degree of aligned text fragments in the wrapping region has a negative impact on its narrative score.

Capital or non-alphabetic ratio: A high degree of normalized text fragments that begin with either a capital letter or non-alphabetic character in the wrapping region has a negative impact on its narrative score To produce a label sub-score for a wrapping region, the following metrics and/or ratios are first calculated:

Normalization ratio: A high degree of normalized fragments in the wrapping region has a positive impact on its label score.

Density ratio: A high fragment density value in the wrapping region has a positive impact on its label score.

Text fragment quantity: A high number of text fragments in the wrapping region has a negative impact on its label score.

Bold count: A high number of bold text fragments in the wrapping region has a positive impact on its label score.

In some example embodiments, to calculate a normalization ratio, the number or count of fragment runs in a wrapping region are calculated. In turn, the calculated count of wrapping regions is divided by the number of text fragments in the wrapping region.

In some example embodiments, to calculate a density ratio, in Step a, a combined area of the text fragments within a wrapping region is identified and/or calculated. In turn, in Step B, the area of all the text fragment intersections is subtracted from the combined area of the text fragments within the wrapping region identified in Step A. In Step C, the area identified in Step A is subtracted from the total area of the wrapping region's bounding box to obtain a value. And, in turn, at Step D, the value obtained in Step C is divided by the total area of the wrapping region's bounding box.

In some example embodiments, to calculate an alignment ratio, a list of left aligned groupings of text fragments within the wrapping region is identified and/or generated. In turn, a list of right aligned groupings of text fragments within the wrapping region is identified and/or generated. In turn, a list of center aligned groupings of text fragments within the wrapping region are identified and/or generated. The groupings of left, right and center aligned text fragments are aggregated and/or combined into a single list that does not include duplicates. In turn, the count of groupings in the list of all groupings (e.g., left, right, center) is divided by the number of fragment runs in the wrapping region.

In some example embodiments, to calculate a capital or non-alphabetic ratio, the starting character (e.g., first, lowest index, leftmost) of the starting (e.g., first, lowest index, leftmost) text fragment of each fragment run of the wrapping region is identified and/or analyzed to calculate a count of how many of those starting text characters are a capital letter or otherwise any Unicode character that is not a lowercase letter. In turn, the calculated count is divided by the number fragment runs in the wrapping region.

In some example embodiments, to calculate a bold text fragment count, the number of text fragments in the wrapping region whose font weight text property (e.g., the whole text fragment or at least a portion of the text fragment) is higher than a predetermined normal font weight.

The calculated metrics are in turn used to calculate sub-scores.

In some example embodiments, one or more tabular score sub-scores are calculated, including (1) a normalization ratio sub-score, (2) a density ratio sub-score, (3) an alignment ratio sub-score, and (4) a capital or non-alphabetic ratio sub-score.

In some example embodiments, to calculate a tabular score normalization ratio sub-score, the normalization ratio is calculated (e.g., using the process described above). In turn, the normalization ratio is multiplied by a predetermined weight (e.g., 4) to produce the tabular score normalization ratio sub-score. A high degree of normalized fragments in the wrapping region has a negative impact on its tabular score.

In some example embodiments, to calculate a tabular score density ratio sub-score, the density ratio is calculated (e.g., using the process described above). In turn, the density ratio is subtracted from a predetermined value (e.g., 1) and that result is multiplied by a predetermined weight (e.g., 2) to produce the tabular score density ratio sub-score. A high fragment density value in the wrapping region has a negative impact on its tabular score.

In some example embodiments, to calculate a tabular score alignment ratio sub-score, the alignment ratio is calculated (e.g., using the process described above). In turn, the alignment ratio is multiplied by a predetermined weight (e.g., 2) to produce the tabular score alignment ratio sub-score. A high degree of aligned (e.g., right, left, center) text fragments in a wrapping region has a positive impact on its tabular score.

In some example embodiments, to calculate a tabular score capital or non-alphabetic ratio sub-score, the capital or non-alphabetic ratio is calculated (e.g., using the process described above). In turn, the capital or non-alphabetic ratio is multiplied by a predetermined weight (e.g., 2) to produce the tabular score capital or non-alphabetic ratio sub-score. A high degree of normalized text fragments that begin with either a capital letter or non-alphabetic character in a wrapping region has a positive impact on its tabular score.

In some example embodiments, one or more narrative score sub-scores are calculated, including (1) a normalization ratio sub-score, (2) a density ratio sub-score, (3) an alignment ratio sub-score, and (4) a capital or non-alphabetic ratio sub-score.

In some example embodiments, to calculate a narrative score normalization ratio sub-score, the normalization ratio is calculated (e.g., using the process described above). In turn, the normalization ratio is subtracted from a predetermined value (e.g., 1) and multiplied by a predetermined weight (e.g., 4) to produce the narrative score normalization ratio sub-score. A high degree of normalized fragments in the wrapping region has a positive impact on its narrative score.

In some example embodiments, to calculate a narrative score density ratio sub-score, the density ratio is calculated (e.g., using the process described above). In turn, the density ratio is multiplied by a predetermined weight (e.g., 2) to produce the narrative score density ratio sub-score. A high fragment density value in the wrapping region has a positive impact on its narrative score.

In some example embodiments, to calculate a narrative score alignment ratio sub-score, the alignment ratio is calculated (e.g., using the process described above). In turn, the alignment ratio is subtracted from a predetermined value (e.g., 1) and multiplied by a predetermined weight (e.g., 2) to produce the narrative score alignment ratio sub-score. A high degree of aligned text fragments in the wrapping region has a negative impact on its narrative score.

In some example embodiments, to calculate a narrative score capital or non-alphabetic ratio sub-score, the capital or non-alphabetic ratio is calculated (e.g., using the process described above). In turn, the capital or non-alphabetic ratio is subtracted from a predetermined value (e.g., 1) and multiplied by a predetermined weight (e.g., 2) to produce the narrative score capital or non-alphabetic ratio sub-score. A high degree of normalized text fragments that begin with either a capital letter or non-alphabetic character in the wrapping region has a negative impact on its narrative score.

In some example embodiments, one or more label score sub-scores are calculated, including (1) a normalization ratio sub-score, (2) a density ratio sub-score, (3) an text fragment quantity sub-score, and (4) a bold fragment count sub-score.

In some example embodiments, to calculate a label score normalization ratio sub-score, the normalization ratio is calculated (e.g., using the process described above). In turn, the normalization ratio is subtracted from a predetermined value (e.g., 1) and multiplied by a predetermined weight (e.g., 4) to produce the label score normalization ratio sub-score. A high degree of normalized fragments in the wrapping region has a positive impact on its label score.

In some example embodiments, to calculate a label score density ratio sub-score, the density ratio is calculated (e.g., using the process described above). In turn, the density ratio is multiplied by a predetermined weight (e.g., 2) to produce the label score density ratio sub-score. A high fragment density value in the wrapping region has a positive impact on its label score.

In some example embodiments, to calculate a label score text fragment quantity sub-score, the text fragment quantity is calculated by counting and/or identifying the number of text fragments in the wrapping region. A fragment quantity cutoff (e.g., predetermined maximum number (e.g., 10)) is set. If the text fragment count or quantity is less than the fragment quantity cutoff, an intermediary score value is set to a predetermined value (e.g., 0.99). Otherwise, if the text fragment count or quantity is not less than the fragment quantity cutoff, the intermediary score value is set, for example to: (1−(0.05*(text_fragement_count−fragment_quantity_cutoff))). The higher of 0.0 and the intermediary score is selected and multiplied by a predetermined weight (e.g., 4.0) to produce the label score text fragment quantity sub-score. A high number (e.g., quantity, count) of text fragments in the wrapping region has a negative impact on its label score.

In some example embodiments, to calculate a label score bold fragment count sub-score, a bold fragment count is calculated (e.g., using the process described above). In turn, the bold fragment count is analyzed to determine whether it is equal to 0.0 and, if so, the label score bold fragment count sub-score is not calculated. Otherwise, an intermediary value is calculated using the formula (1−(text_fragment_count−bold_fragment_count)*0.05). The higher of a predetermine value (e.g., 0.5) and the intermediary value is selected and multiplied by a predetermined weight (e.g., 6.0) to produce a label score bold fragment count sub-score. A high number of bold text fragments in the wrapping region has a positive impact on its label score.

It should be understood that the above values used to calculate the metrics and/or sub-scores are exemplary embodiments, and other values may be used in accordance with the present algorithms.

In some example embodiments, the sub-scores are calculated for all or a portion of the wrapping regions prior to calculating the type scores. The type scores are used to determine and/or identify how closely a wrapping region identifies as a tabular, narrative or label block type wrapping region. In some example embodiments, type scores (e.g., scores) are decimal values between (e.g., between 0.0 and 1.0) that are produced by calculating and combining the sub-scores. That is, the tabular sub-scores are combined with each other, the narrative sub-scores are combined with each other, and the label sub-scores are combined with each other, to generate the respective type scores. To combine sub-scores, a sum of the sub-scores to be combined is divided by the sum of the weights used to calculate those sub-scores (e.g., the weighted average of the sub-scores corresponding to the wrapping region).

As a result, type scores (e.g., tabular score, narrative score, and label score) for each wrapping region are calculated. That is, the type scores are calculated using the calculated weighted average of the sub-scores corresponding to the wrapping regions, thereby identifying how closely each wrapping region is to a tabular, narrative or label block type.

At step 454 of FIG. 4B, the block types (e.g., tabular, narrative, label) are assigned to each wrapping region in the wrapping region collection. In some example embodiments, the block type that is assigned to a wrapping region is based on the highest of the type scores computed at step 452 for that wrapping region. Thus, if the label score is better (e.g., higher) than the narrative and tabular scores for a wrapping region, the wrapping region is labeled, marked and/or identified as a label-type wrapping region.

In some example embodiments, special conditions are applied when assigning block types to each wrapping region. For example, one special condition is that a wrapping region made up of a single numeric fragment is, in some example embodiments, is given a 1.0 tabular score. Another special condition may be that a wrapping region made up of a single text fragment is always given a predetermined (e.g., 1.0) label score.

It should be understood that in some example embodiments, the scores, ratios, weights, and ranges described above in connection with FIG. 4B can be modified to fit a different model.

Aggregation Algorithms

Figure 5A:
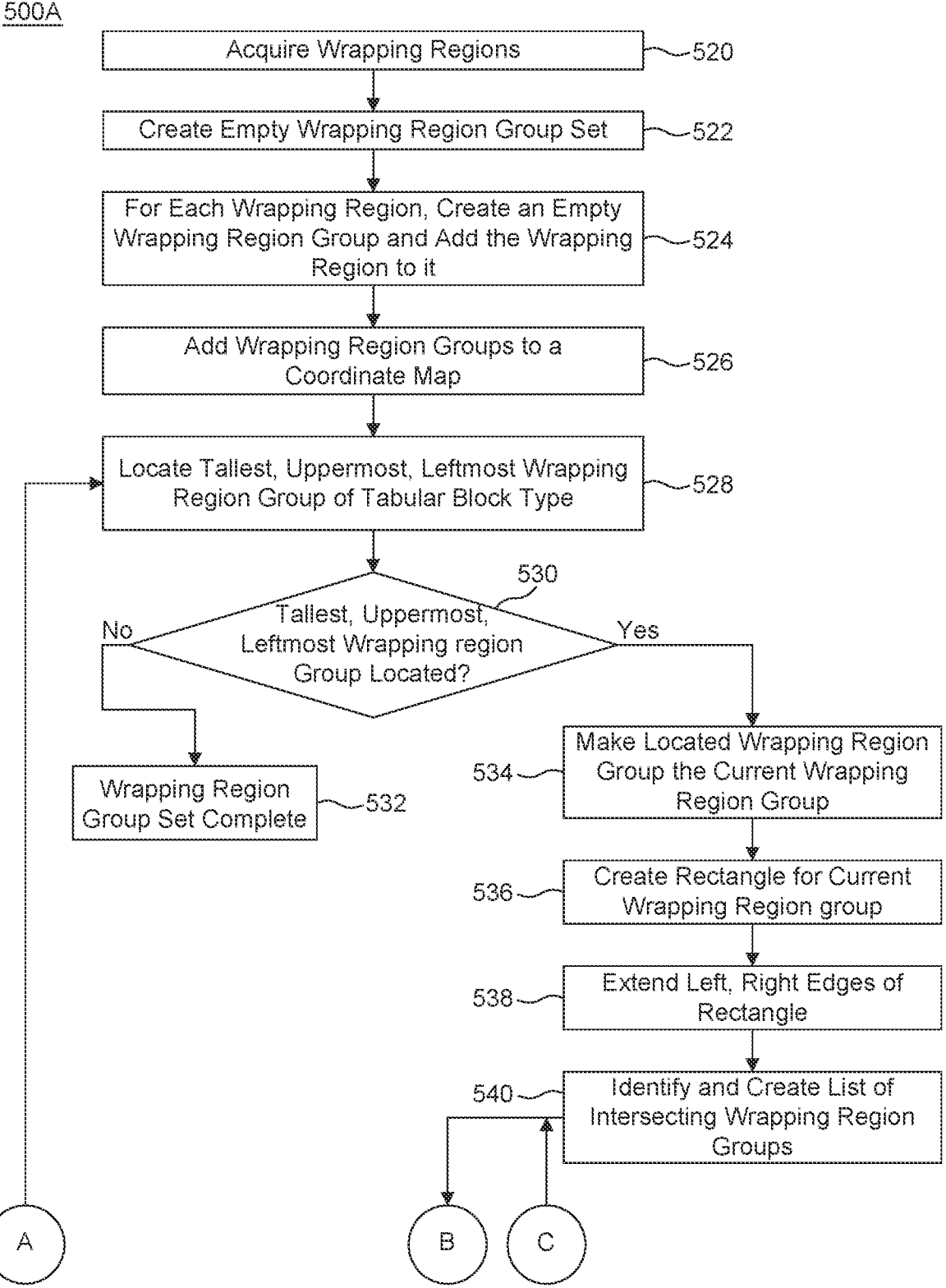
FIG. 5A(I) illustrates a first part of a flow chart for executing a horizontal aggregation algorithm or a horizontal aggregation portion of an aggregation algorithm, according to an exemplary embodiment.

FIG. 5A illustrates a flow chart 500A for executing a horizontal aggregation algorithm or a horizontal aggregation portion of an aggregation algorithm, according to an exemplary embodiment. As shown in FIG. 5A, at step 520, wrapping regions associated with a rendered page of a print-ready digital source document are acquired, retrieved and/or identified. In some example embodiments, the wrapping regions are associated with spatial coordinates on the rendered page and their block types have been determined, using, for instance, the wrapping and classification algorithms described above in connection with FIGS. 2G and 4B, respectively.

Figure 5B:
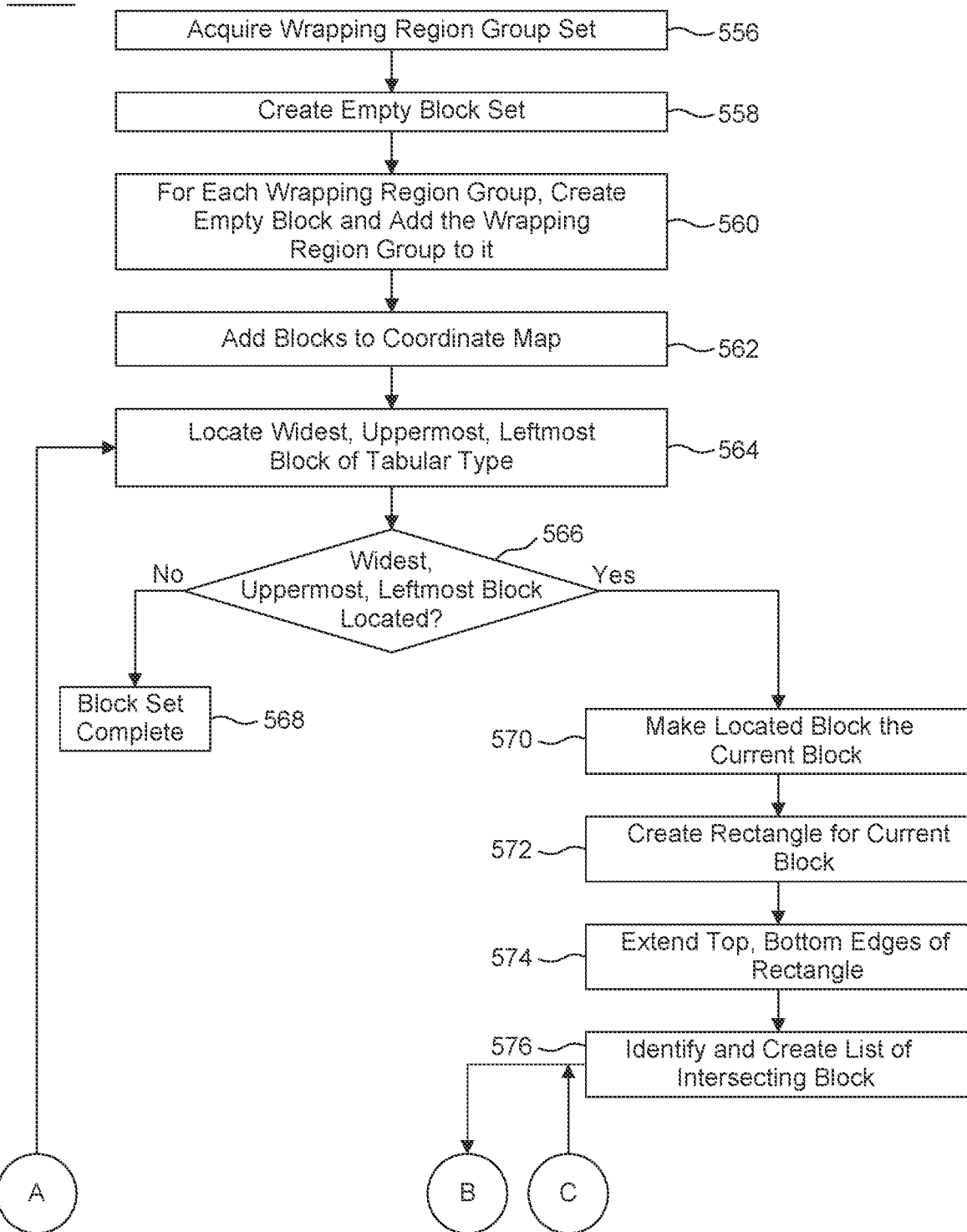
FIG. 5B (I) illustrates a first part of a flow chart for executing a vertical aggregation algorithm or a vertical aggregation portion of an aggregation algorithm, according to an exemplary embodiment.
Figure 5C:
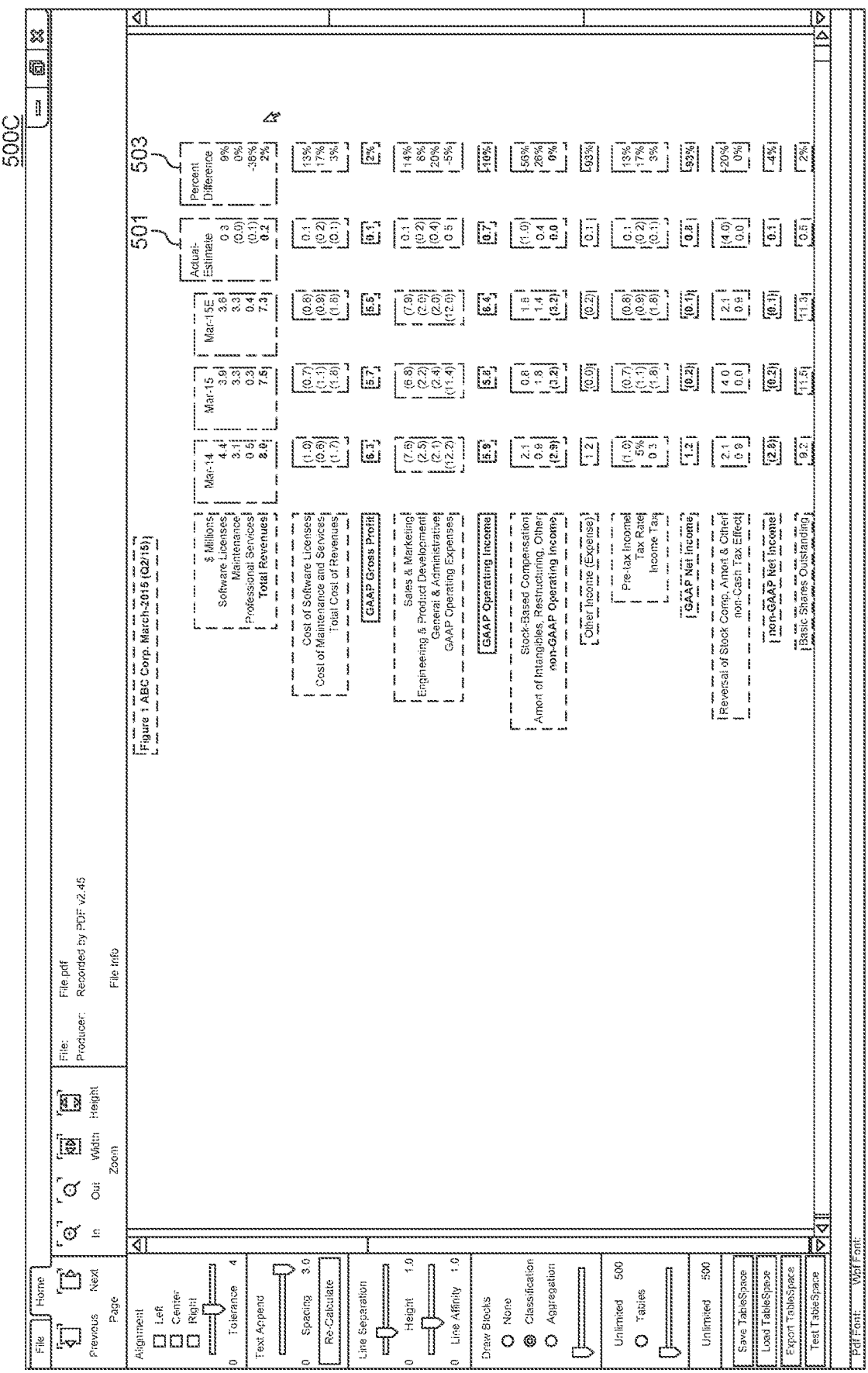
FIG. 5C illustrates an interface for generating tables from print-ready digital source documents according to an exemplary embodiment.

FIG. 5C illustrates an interface 500C for generating tables from print-ready digital source documents according to an exemplary embodiment. In FIG. 5C, wrapping regions that have been acquired, retrieved and/or identified are delineated by corresponding bounding boxes. For instance, FIG. 5C illustrates wrapping regions such as wrapping region 501 and 503, each of which is associated with and/or has spatial coordinates on the rendered page, as well as a corresponding block type (e.g., tabular data).

In turn, at step 522, an empty wrapping region group set (or wrapping region group collection) is created, generated and/or retrieved. At step 524, for each wrapping region acquired at step 520, a corresponding empty wrapping region group is created, and each wrapping region is added to its corresponding wrapping region group. In this way, each wrapping region acquired at step 520 is added to its own corresponding wrapping region group which contains no other data.

At step 526, the wrapping region groups are added to a coordinate map of the rendered page, based on the spatial coordinates of the wrapping region groups. The wrapping region groups are indexed according to their respective spatial coordinates, for example, ordered by their appearance on the rendered page, from top down and left to right, such that a topmost and leftmost wrapping region group is the wrapping region group with the first index on the rendered page and the wrapping region group to its right is the wrapping region group with the second index on the rendered page. In this way, the wrapping region group with the last index on the rendered page is the bottommost and rightmost wrapping region group on the rendered page.

At step 528, the tallest, uppermost and leftmost wrapping region group on the coordinate map that is of a tabular block type is located. A determination is made at step 530 as to whether a tallest, uppermost and leftmost wrapping region group on the coordinate map that is of a tabular block type was identified at step 528. That is, the determination at step 530 identifies whether any tabular wrapping region groups remain to be processed. If it is determined at step 530 that no such wrapping region groups were located and/or identified at step 528, the aggregation algorithm concludes and/or determines, at step 532, that the wrapping region group set is complete.

On the other hand, if it is determined at step 530 that a tallest, uppermost and leftmost wrapping region group on the coordinate map that is of a tabular block type was identified and/or located at step 528, that wrapping region group (e.g., the wrapping region group identified at step 528) is labeled, assigned, marked and/or flagged as the current wrapping region group at step 534.

Figure 5D:
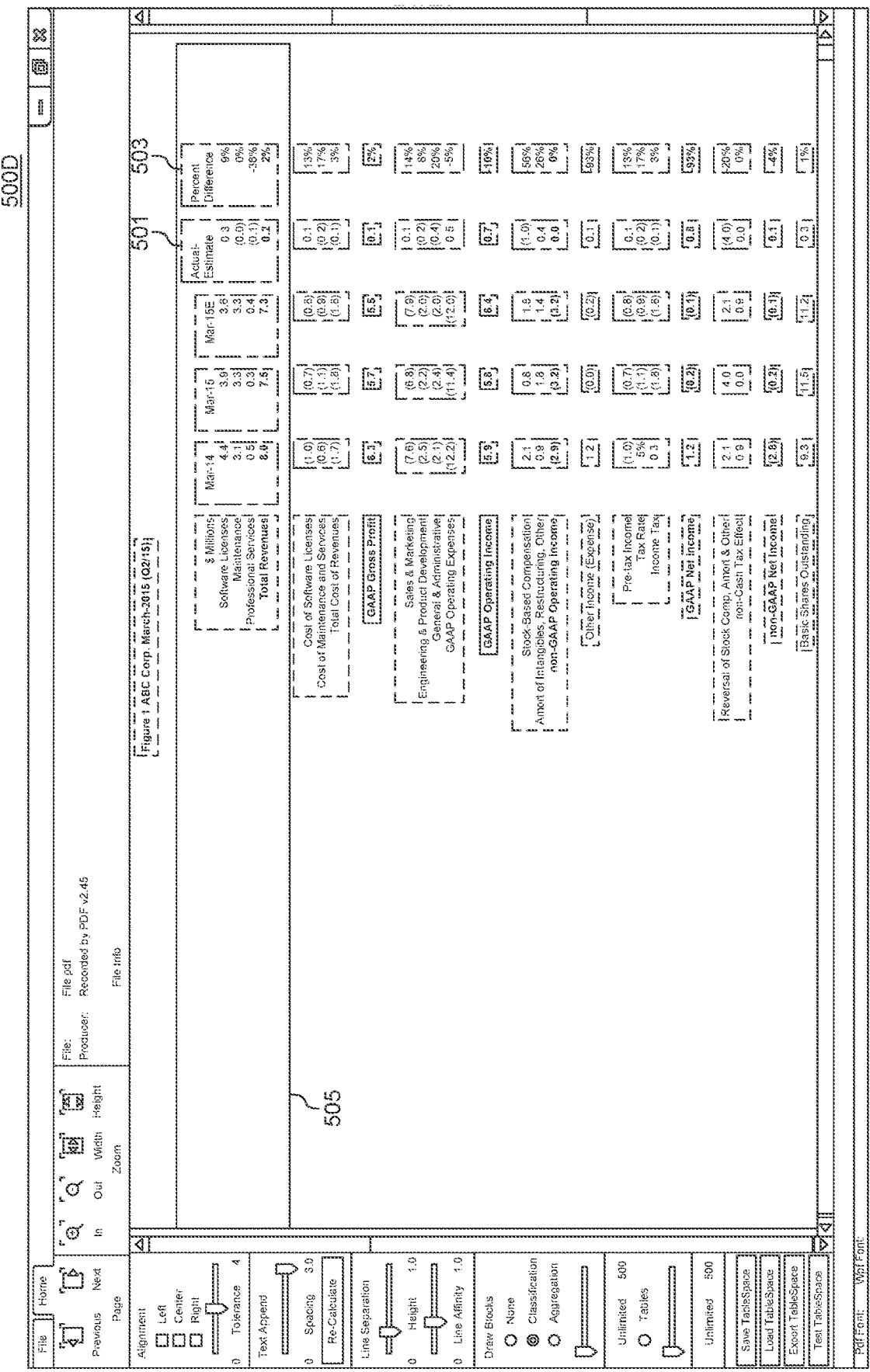
FIG. 5D illustrates an interface for generating tables from print-ready digital source documents according to an exemplary embodiment.

In turn, at step 536, a rectangle is created, matching the dimensions and spatial coordinates or position of the bounding box (e.g., rectangular area) of the current wrapping region group. At step 538, the left and right edges, borders and/or boundaries of the rectangle created at step 534 are extended to match the right and left edges, borders and/or boundaries of the bounding box of the coordinate map. FIG. 5D illustrates an interface 500D for generating tables from print-ready digital source documents according to an exemplary embodiment. As shown in FIG. 5D, rectangle 505 has been created and its right and left edges have been extended to match the right and left edges of the coordinate map. In FIG. 5D, the rectangle 505 was created to match the dimensions and spatial position of the bounding box of wrapping region 501, which is the tallest, uppermost and leftmost wrapping region group that is of a tabular type.

At step 540, using the coordinate map, wrapping region groups whose bounding boxes intersect with the rectangle (e.g., rectangle 505) created at step 536 are identified and added to a list (e.g., intersecting wrapping region groups list). That is, at step 540, each wrapping region group on the coordinate map is analyzed to determine whether its bounding box at all intersects with the extended rectangle of the current wrapping region group. At step 542, the list of intersecting wrapping region groups is analyzed to determine whether any wrapping region groups remain in it (e.g., to determine if any intersecting wrapping region groups still need to be processed). If it is determined at step 542 that no intersecting wrapping region groups remain in the list, the aggregation algorithm proceeds to step 552, which is described in further detail below.

On the other hand, if it is determined at step 542 that intersecting wrapping region groups indeed remain in the list (e.g., the list created at step 540), the intersecting wrapping region group that is at the top of the list (e.g., first index) is removed from the list at step 544. The wrapping region group removed from the list at step 544 is analyzed and a corresponding merge score is computed for that wrapping region group at step 546.

The merge score calculated and/or computed at step 546 is used to determine if two wrapping region groups should be merged (e.g., because the wrapping region groups have similar and/or matching characteristics). For example, at step 546, the merge score for the wrapping region group removed from the list at step 544 indicates whether it should be merged with the current wrapping region group. The merge score is calculated from sub-scores based on properties of all or a portion of the wrapping region groups. In some example embodiments, the sub-scores are decimal values (e.g., between 0.0 and 1.0) that possess an integer weight. The merge score is calculated by combining merge score sub-scores. To combine the merge score sub-scores, the sub-scores are summed and divided by the sum of the weights used to calculate and/or corresponding to the sub-scores.

For example, sub-scores (e.g., merge score sub-scores) corresponding to the wrapping region groups are based on and/or calculated on the following properties:

Vertical alignment: Top and bottom alignment between two wrapping region groups has a positive impact on their merge score.

Block type: Matching block types between two wrapping region groups has a positive impact on their merge score.

Matching lines: Lines that match on aspects such as vertical position and bounding box height have a positive impact on the wrapping regions' merge score.

In some example embodiments, to calculate a merge score vertical alignment sub-score, the sub-score is initialized to a predetermined value (e.g., 0.0). The top (e.g., based on measurements or vertical coordinates of the top boundary on the rendered page) of a first wrapping region and the top (e.g., based on measurements or coordinates of the top boundary on the rendered page) of a second wrapping region to be potentially merged are compared. The absolute value of the difference between the top of the first wrapping region and the top of the second wrapping region is calculated. If the calculated absolute value is within a predetermined tolerance (e.g., 10 units), the first and second wrapping regions are considered to be top aligned with one another. In turn, the bottom (e.g., based on measurements or vertical coordinates of the bottom boundary on the rendered page) of the first wrapping region and the bottom (e.g., based on measurements or vertical coordinates of the bottom boundary on the rendered page) of the second wrapping region are compared. The absolute value of the difference between the bottom of the first wrapping region and the bottom of the second wrapping region is calculated. If the calculated absolute value is within a predetermined tolerance (e.g., 10 units), the first and second wrapping regions are considered to be bottom aligned. A match percentage between the first and second wrapping regions is added to the corresponding sub-score. For example, if there is no match (e.g., based on the vertical alignment) between the wrapping regions, the match percentage added to the sub-score is 0.0; if there is a partial match (e.g., some vertical alignment), the match percentage added to the sub-score is between 0.0 and 1.0; and, if there is a perfect match (e.g., full vertical alignment), the match percentage added to the sub-score is 1.0. In turn, the sub-score is multiplied by a predetermined weight (e.g., 3.0) to produce the merge score vertical alignment sub-score.

In some example embodiments, to calculate a merge score block type sub-score, the sub-score is initialized to a predetermined value (e.g., 0.0). If the type (e.g., narrative, tabular, label) of a first wrapping region is equal to or the same as the type of a second wrapping region, 1.0 is added to the sub-score. In turn, the sub-score is multiplied by a predetermined weight (e.g., 3.0) to produce the merge score block type sub-score In some example embodiments, to calculate a merge score matching lines sub-score, the sub-score is initialized to a predetermined value (e.g., 0.0). Among two wrapping regions being considered to be merged, it is determined which of the two wrapping regions has fewer lines. The wrapping region of the two wrapping regions that has the fewest number of lines is assigned and/or labeled as the first wrapping region, and the other wrapping region is assigned and/or labeled as the second wrapping region. For each line the first wrapping region, it is determined whether there is a matching line in the second wrapping region. In some example embodiments, matching lines are two lines, in different wrapping regions, that have the same vertical alignment as one another. A value is calculated by taking the number of matching lines between the first and second wrapping regions and dividing it by the absolute value of the difference in the number of lines in the first wrapping region and the number of lines in the second wrapping region (e.g., matching_lines/(|lines_in_first_wrapping region−lines_in_second_wrapping_region|)). The calculated value is added to the sub-score and the sub-score is multiplied by a predetermined weight (e.g., 3.0) to produce the merge score matching lines sub-score.

In turn, at step 548, the merge score calculated at step 546 for the wrapping region group removed from the list at step 544 is analyzed to determine whether it is equal to or greater than a predetermined merge threshold. If it is determined at step 548 that the merge score is not equal to or greater than the merge threshold, the wrapping region group removed from the list at step 544 is not merged and the aggregation algorithm returns to step 542. Steps 542, 544, 546 and 548 are repeated with the next intersecting wrapping region group at the top of the list, until no intersecting wrapping region groups remain in the list, at which point the aggregation algorithm proceeds to step 552, which is described in further detail below.

If, on the other hand, it is determined at step 548 that the merge score for the wrapping region group removed from the list is indeed equal to or greater than the merge threshold, the wrapping region group removed from the list is merged into or with the current wrapping region group. In turn, the aggregation algorithm returns to step 542. Steps 542, 544, 546 and 548 are repeated with the next intersecting wrapping region group at the top of the list, until no intersecting wrapping region groups remain in the list, at which point the aggregation algorithm proceeds to step 552, which is described in further detail below.

At step 552, wrapping region groups that have been merged with and/or into the current wrapping region group are removed from the coordinate map. At step 554, the current wrapping region group is added and/or appended to the wrapping region group set created at step 522. In turn, the aggregation algorithm returns to step 528, where the tallest, uppermost and leftmost wrapping region group on the coordinate map that is of a tabular block type is located. It should be understood that the coordinate map, on each subsequent iteration, has had wrapping region groups removed from it and therefore the tallest, uppermost and leftmost wrapping region group on the coordinate map that is of a tabular block type that is located on subsequent iterations is different than previously identified tallest, uppermost and leftmost wrapping region groups on the coordinate map that are of a tabular block type.

Figure 5E:
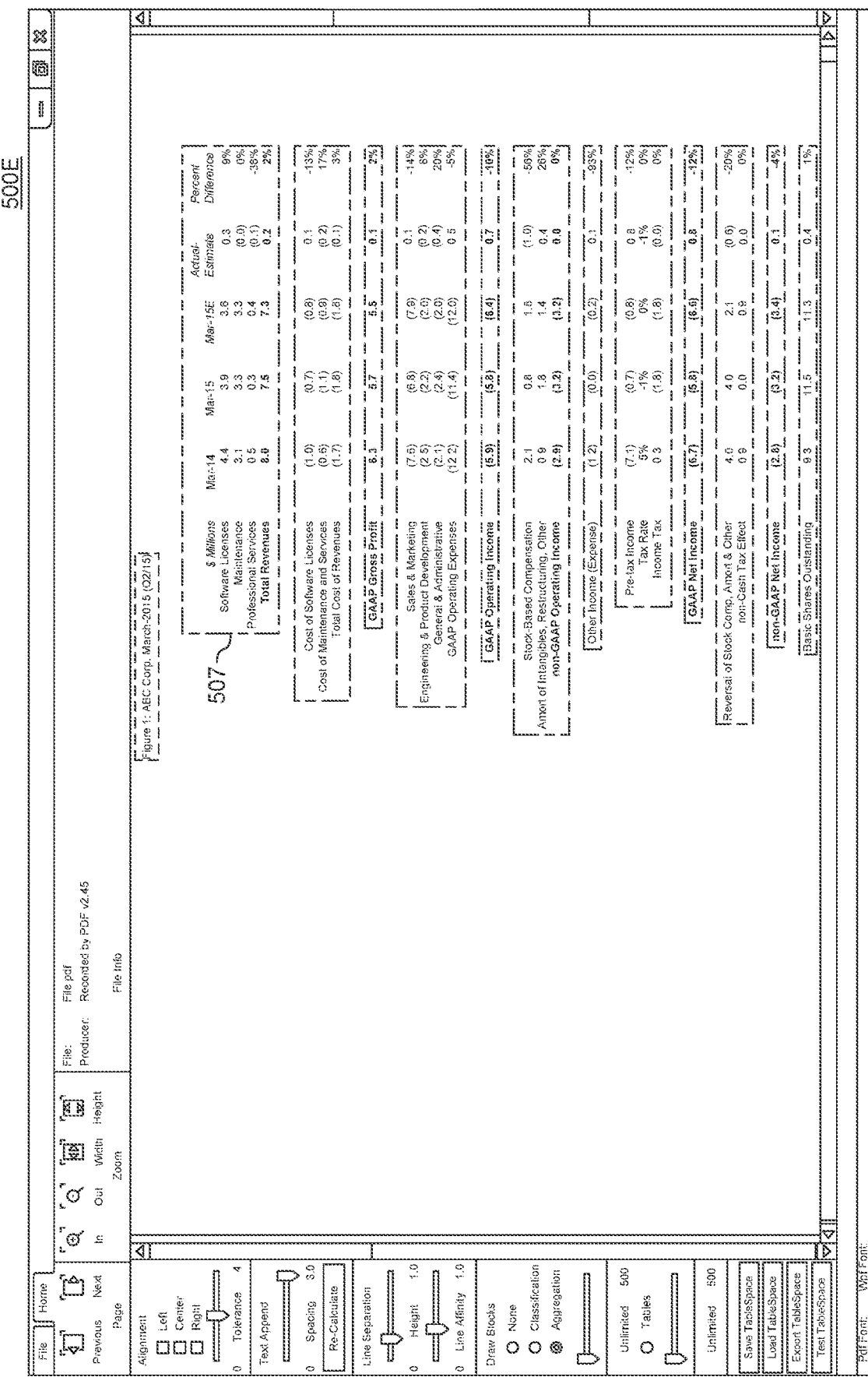
FIG. 5E illustrates an interface for generating tables from print-ready digital source documents according to an exemplary embodiment.

The horizontal aggregation algorithm described above in connection with FIG. 5A results in wrapping regions being merged. FIG. 5E illustrates an interface 500E for generating tables from print-ready digital source documents according to an exemplary embodiment. As shown in FIG. 5E, wrapping regions identified in FIG. 5D have been merged into wrapping region groups such as wrapping region group 507.

A merge of wrapping regions indicates, in some instances, that merged wrapping regions are, correspond to, and/or should be considered as part of a same table.

FIG. 5B illustrates a flow chart 500B for executing a vertical aggregation algorithm or a vertical aggregation portion of an aggregation algorithm, according to an exemplary embodiment.

As shown in FIG. 5B, at step 556, a wrapping region group set including wrapping region groups associated with a rendered page of a print-ready digital source document are acquired, retrieved and/or identified. In some example embodiments, the wrapping region groups are associated with spatial coordinates on the rendered page and their block types have been determined, using, for instance, the wrapping and classification algorithms described above in connection with FIGS. 2G and 4B, respectively. The wrapping region groups, in some example embodiments, are acquired, retrieved and/or identified using the horizontal aggregation algorithm described above in connection with FIG. 5A.

In turn, at step 558, an empty block set (or block table collection) is created, generated and/or retrieved. At step 560, for each wrapping region group in the wrapping group set acquired at step 556, a corresponding empty block is created, and each wrapping region group is added to its corresponding block. In this way, each wrapping region group acquired at step 556 is added to its own corresponding block which contains no other data.

At step 562, the blocks are added to a coordinate map of the rendered page, based on the spatial coordinates of the blocks. The blocks are indexed according to their respective spatial coordinates, for example, ordered by their appearance on the rendered page, from top down and left to right, such that a topmost and leftmost block is the block with the first index on the rendered page and the block to its right is the block with the second index on the rendered page. In this way, the block with the last index on the rendered page is the bottommost and rightmost block on the rendered page.

At step 564, the widest, uppermost and leftmost block on the coordinate map that is of a tabular block type is located. The widest, uppermost and leftmost block in that priority order (e.g., widest>uppermost>leftmost). A determination is made at step 566 as to whether a widest, uppermost and leftmost block on the coordinate map that is of a tabular block type was identified or located at step 564. That is, the determination at step 566 identifies whether any tabular blocks remain to be processed. If it is determined at step 566 that no such blocks were located and/or identified at step 564, the aggregation algorithm concludes and/or determines, at step 568, that the block set is complete.

On the other hand, if it is determined at step 566 that a widest, uppermost and leftmost block on the coordinate map that is of a tabular block type was identified and/or located at step 564, that block (e.g., the block identified at step 564) is labeled, assigned, marked and/or flagged as the current block at step 570.

Figure 5F:
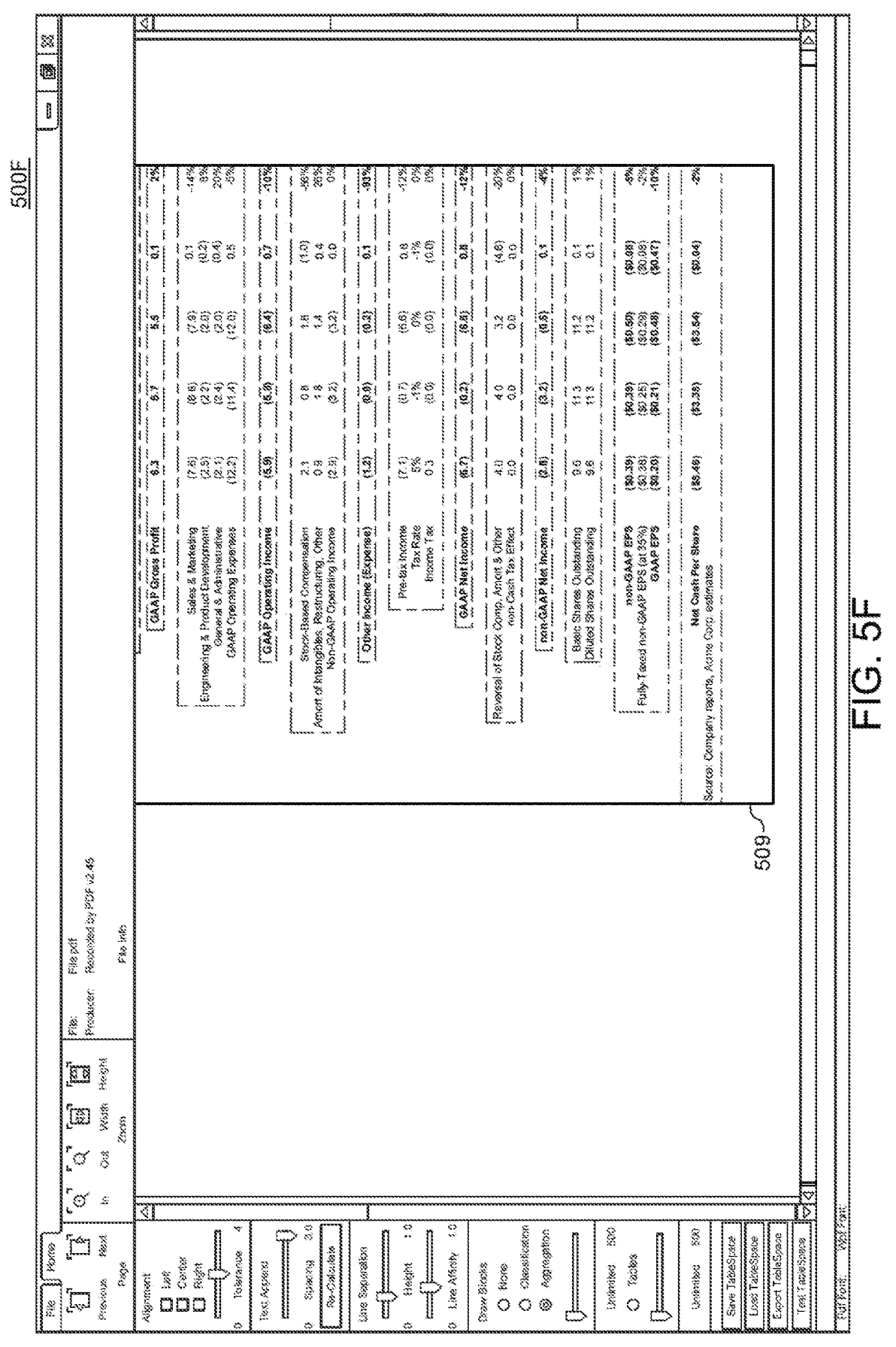

In turn, at step 572, a rectangle is created, matching the dimensions and spatial coordinates or position of the bounding box (e.g., rectangular area) of the current block. At step 574, the top and bottom edges, borders and/or boundaries of the rectangle created at step 572 are extended to match the top and bottom edges, borders and/or boundaries of the bounding box of the coordinate map. FIG. 5F illustrates an interface 500F for generating tables from print-ready digital source documents according to an exemplary embodiment. As shown in FIG. 5F, rectangle 509 has been created and its top and bottom edges have been extended to match the right and left edges of the coordinate map. In FIG. 5F, the rectangle 509 was created to match the dimensions and spatial position of the bounding box of wrapping region group which is the widest, uppermost and leftmost block on the coordinate map that is of a tabular block type.

At step 576, using the coordinate map, blocks whose bounding boxes intersect with the rectangle (e.g., rectangle 509) created at step 572 and extended at step 574 are identified and added to a list (e.g., intersecting blocks list). That is, at step 576, each block on the coordinate map is analyzed to determine whether its bounding box at all intersects with the extended rectangle of the current block. At step 578, the list of intersecting blocks is analyzed to determine whether any blocks remain in it (e.g., to determine if any intersecting blocks still need to be processed). If it is determined at step 578 that no intersecting blocks remain in the list, the aggregation algorithm proceeds to step 588, which is described in further detail below.

On the other hand, if it is determined at step 578 that intersecting blocks indeed remain in the list (e.g., the list created at step 576), the intersecting block that is at the top of the list (e.g., first index) is removed from the list at step 580. The block removed from the list at step 580 is analyzed and a corresponding merge score is computed for that block at step 582.

The merge score calculated and/or computed at step 582 is used to determine if two blocks should be merged (e.g., because the blocks have similar and/or matching characteristics). For example, at step 582, the merge score for the block removed from the list at step 580 indicates whether it should be merged with the current blocks. The merge score is calculated from sub-scores based on properties of all or a portion of the blocks. In some example embodiments, the sub-scores are decimal values (e.g., between 0.0 and 1.0) that possess an integer weight. The merge score is calculated by combining merge score sub-scores. The combine the merge score sub-scores, the sub-scores are summed and divided by the sum of the weights used to calculate and/or corresponding to the sub-scores.

For example, properties calculated and/or used to produce sub-scores (e.g., merge score sub-scores) corresponding to the blocks include:
  Horizontal alignment: Left and right alignment between two blocks has a positive impact on their merge score.
  Column position: Horizontal overlap between the columns of two blocks has a positive impact on their merge score.
  Column alignment: Columns with matching position as well as matching wrapping region alignment (left, right, center) have a positive impact on the merge score of the blocks.
  Column data type: Columns with matching position as well as matching data type have a positive impact on the merge score of the blocks.

In some example embodiments, to calculate a merge score horizontal alignment subs-score, the sub-score is initialized to a predetermined value (e.g., 0.0). The left side (e.g., based on measurements or horizontal coordinates of the left boundary on the rendered page) of a first block and the left side (e.g., based on measurements or horizontal coordinates of the left boundary on the rendered page) of a second block are compared. The absolute value of the difference between the left of the first block and the left of the second block is calculated. If the calculated absolute value is within a predetermined tolerance (e.g., 10 units), the first and second blocks are considered to be left aligned. In turn, the right side (e.g., based on measurements or horizontal coordinates of the right boundary on the rendered page) of the first block and the right side (e.g., based on measurements or horizontal coordinates of the right boundary on the rendered page) of the second block are compared. The absolute value of the difference between the right of the first block and the right of the second block is calculated. If the calculated absolute value is within a predetermined tolerance (e.g., 10 units), the first and second blocks are considered to be right aligned. A match percentage between the first and second blocks is added to the corresponding sub-score. For example, if there is no match (e.g., based on the horizontal alignment) between the blocks, the match percentage added to the sub-score is 0.0; if there is a partial match (e.g., some horizontal alignment), the match percentage added to the sub-score is between 0.0 and 1.0; and, if there is a perfect match (e.g., full horizontal alignment), the match percentage added to the sub-score is 1.0. In turn, the sub-score is multiplied by a predetermined weight (e.g., 3.0) to produce the merge score horizontal alignment sub-score.

In some example embodiments, to calculate a merge score column position sub-score, the sub-score is initialized to a predetermined value (e.g., 0.0). Among two blocks being considered to be merged, it is determined which of the two blocks has the fewest number of columns. The block of the two blocks that has the fewest number of columns is assigned and/or labeled as the first block, and the other block is assigned and/or labeled as the second block. For each column in the first block, it is determined whether there (1) is a column in the second block that has matching and/or similar horizontal alignment as the column in the first block, and/or (2) are columns in the second block that have horizontal overlap with the column in the first block. If a column in the first block has a perfect horizontal alignment to a column in the second block, it is considered to be "strongly positioned." Each column in the second block that is determined to be "strongly positioned" causes the sub-score to be incremented by a predetermined amount (e.g., 0.1). If a column in the first block has a partial horizontal alignment to a column in the second block, it is determined to be "weakly positioned." Each column in the second block that is determined to be "weakly positioned" causes the sub-score to be incremented by a lesser predetermined amount (e.g., 0.05) than for "strongly positioned" columns. In some example embodiments, if a column from the first block is identified and/or determined to overlap multiple columns in the second block, a sub-score of 0.0 is automatically returned. In turn, the sub-score is multiplied by a predetermined weight (e.g., 3) to produce the merge score column position sub-score.

In some example embodiments, to calculate a merge score column alignment sub-score, the sub-score is initialized to a predetermined value (e.g., 0.0). Among two blocks being considered to be merged, it is determined which of the two blocks has the fewest number of columns. The block of the two blocks that has the fewest number of columns is assigned and/or labeled as the first block, and the other block is assigned and/or labeled as the second block. For each column in the first block, it is determined whether there is a column in the second block that has the same left and/or right alignment (e.g., based on measurements or horizontal coordinates of the left and right boundaries on the rendered page). The number of matching columns divided by the absolute value of the difference in the number of columns in the first block and the number of columns in the second block are added to the sub score (e.g., matching columns/(|columns_in_first_block−columns_in_second_block|)).

The sub-score is multiplied by a predetermined weight (e.g., 3.0) to produce the merge score column alignment sub-score.

In some example embodiments, to calculate a merge score column data type sub-score, the sub-score is initialized to a predetermined value (e.g., 0.0). Among two blocks being considered to be merged, it is determined which of the two blocks has the fewest number of columns. The block of the two blocks that has the fewest number of columns is assigned and/or labeled as the first block, and the other block is assigned and/or labeled as the second block. For each column in the first block, it is determined whether there is a column in the second block that has the same left and/or right alignment (e.g., based on measurements or horizontal coordinates of the left and right boundaries on the rendered page). If such a column is identified the data type (e.g., tabular, label, narrative) of the column in the first block is compared to the data type of the column in the second block. If the data types of the two columns match and/or are equal to each other, the sub-score is incremented by: 1/columns_in_first_block (e.g., sub-score=sub-score+(1/columns_in_first_block)). In turn, the sub-score is multiplied by a predetermined weight (e.g., 3.0) to produce the merge score column data type sub-score.

In turn, at step 584, the merge score calculated at step 582 for the block removed from the list at step 580 is analyzed to determine whether it is equal to or greater than a predetermined merge threshold. If it is determined at step 584 that the merge score is not equal to or greater than the merge threshold, the block removed from the list at step 580 is not merged and the aggregation algorithm returns to step 578. Steps 578, 580, 582 and 584 are repeated with the next intersecting block at the top of the list, until no intersecting blocks remain in the list, at which point the aggregation algorithm proceeds to step 588, which is described in further detail below.

If, on the other hand, it is determined at step 584 that the merge score for the block removed from the list is indeed equal to or greater than the merge threshold, the block removed from the list is merged into or with the current block. In turn, the aggregation algorithm returns to step 578. Steps 578, 580, 582 and 584 are repeated with the next intersecting block at the top of the list, until no intersecting blocks remain in the list, at which point the aggregation algorithm proceeds to step 588, which is described in further detail below.

At step 588, blocks that have been merged with and/or into the current block are removed from the coordinate map. At step 590, the current block is added and/or appended to the block set created at step 558. In turn, the aggregation algorithm returns to step 564, where the widest, uppermost and leftmost block on the coordinate map that is of a tabular block type is located. It should be understood that the coordinate map, on each subsequent iteration, has had blocks removed from it and therefore widest, uppermost and leftmost block on the coordinate map that is of a tabular block type that is located on subsequent iterations is different than previously identified widest, uppermost and leftmost blocks on the coordinate map that are of a tabular block type is located.

The vertical aggregation algorithm described above in connection with FIG. 5B results in blocks being merged into a block set. FIG. 5G illustrates an interface 500G for generating tables from print-ready digital source documents according to an exemplary embodiment. As shown in FIG. 5G, blocks are merged into a block set such as block set 511. A merge of blocks indicates, in some instances, that merged blocks are, correspond to, and/or should be considered as part of a same table.

A table is generated from and/or corresponds to the block set, such that each text fragment in a block set corresponds to a field, cell or the like (e.g., row, column intersection). For example, Table 1 below illustrates a portion of a table generated from the block set 511 identified using the aggregation algorithm described in connection with FIGS. 5A and 5B:

TABLE 1

| $ Millions | Mar-14 | Mar-15 | Mar-15E | Actual − Estimate | Percent Difference |
|---|---|---|---|---|---|
| Software Licenses | 4.4 | 3.9 | 3.9 | 0.3 | 9% |
| Maintenance | 3.1 | 3.3 | 3.3 | (0.0) | 0% |
| Professional Services | 0.5 | 0.3 | 0.3 | (0.1) | −36% |
| Total Revenues | 8.0 | 7.5 | 7.5 | 0.2 | 2% |

Figure 6:
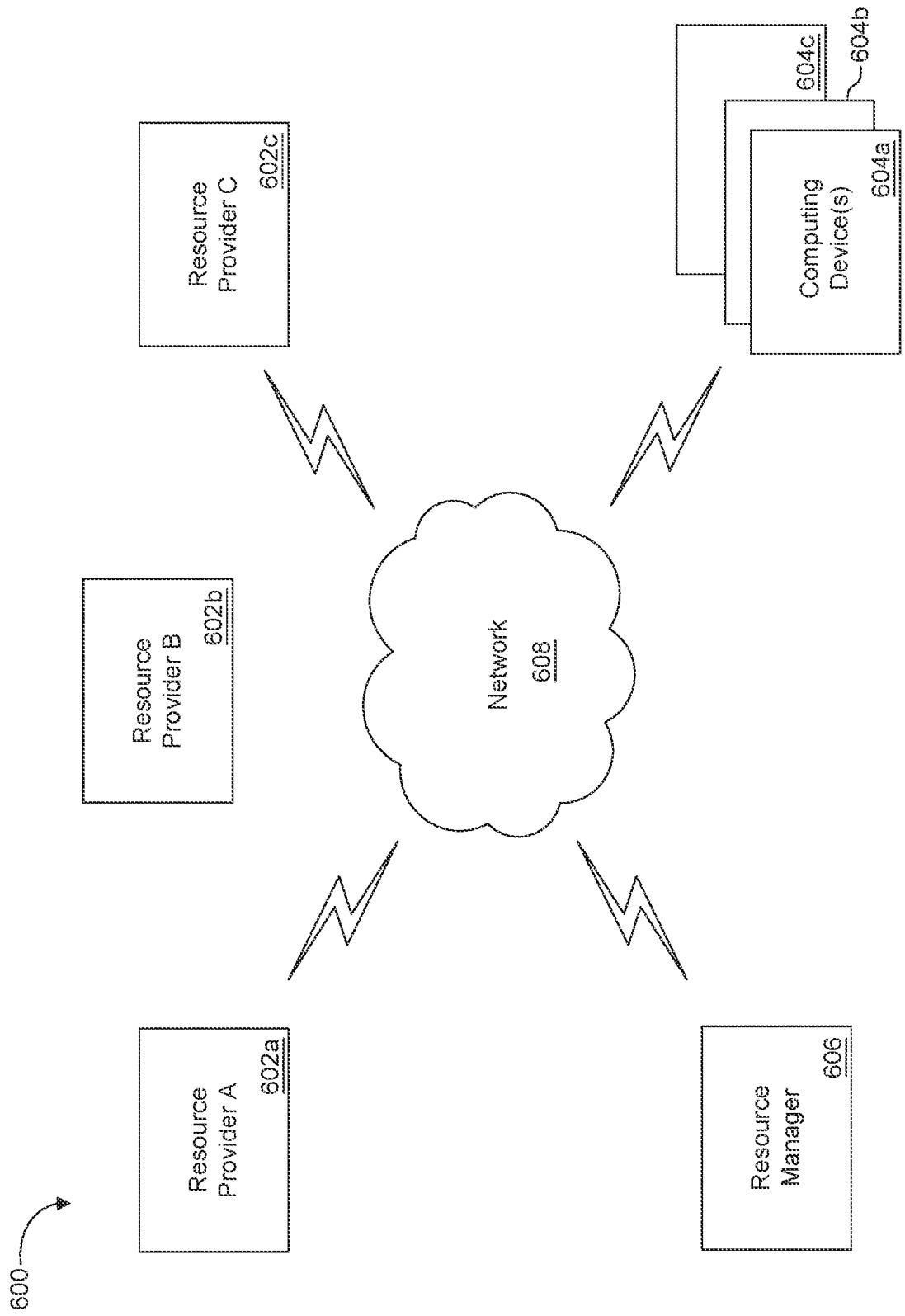
FIG. 6 is a block diagram of an example network environment for use in the methods and systems described herein, according to an illustrative embodiment.

FIG. 6 shows an illustrative network environment 600 for use in the methods and systems described herein. In brief overview, referring now to FIG. 6, a block diagram of an exemplary cloud computing environment 600 is shown and described. The cloud computing environment 600 may include one or more resource providers 602*a*, 602*b*, 602*c* (collectively, 602). Each resource provider 602 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 602 may be connected to any other resource provider 602 in the cloud computing environment 600. In some implementations, the resource providers 602 may be connected over a computer network 608. Each resource provider 602 may be connected to one or more computing device 604*a*, 604*b*, 604*c* (collectively, 604), over the computer network 608.

The cloud computing environment 600 may include a resource manager 606. The resource manager 606 may be connected to the resource providers 602 and the computing devices 604 over the computer network 608. In some implementations, the resource manager 606 may facilitate the provision of computing resources by one or more resource providers 602 to one or more computing devices 604. The resource manager 606 may receive a request for a computing resource from a particular computing device 604. The resource manager 606 may identify one or more resource providers 602 capable of providing the computing resource requested by the computing device 604. The resource manager 606 may select a resource provider 602 to provide the computing resource. The resource manager 606 may facilitate a connection between the resource provider 602 and a particular computing device 604. In some implementations, the resource manager 606 may establish a connection between a particular resource provider 602 and a particular computing device 604. In some implementations, the resource manager 606 may redirect a particular computing device 604 to a particular resource provider 602 with the requested computing resource.

Figure 7:
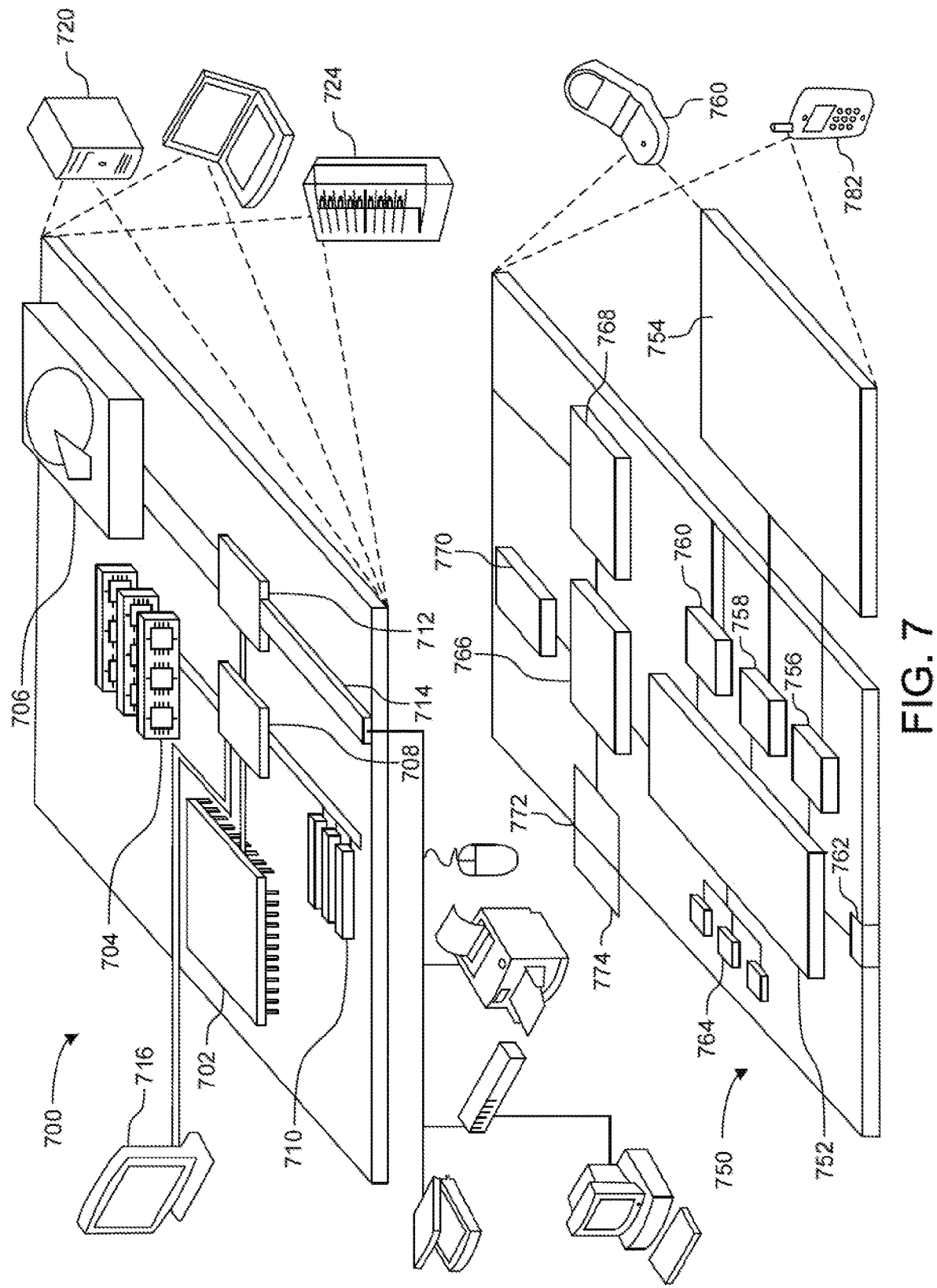
FIG. 7 is a block diagram of an example computing device and an example mobile computing device, for use in illustrative embodiments of the invention.

FIG. 7 shows an example of a computing device 700 and a mobile computing device 750 that can be used in the methods and systems described in this disclosure. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provided as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth®, Wi-Fi™, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method comprising:
   receiving, by one or more processors, a digital document comprising at least one rendered page;
   generating, by the one or more processors, one or more wrapping regions based on the digital document, wherein each wrapping region comprises one or more fragment runs, and wherein each fragment run comprises one or more text fragments of the digital document that are adjacent to one another and within a horizontal separation threshold and a vertical separation threshold;
   classifying, by the one or more processors, each of the one or more wrapping regions, wherein classifying each of the one or more wrapping regions comprises assigning each of the one or more wrapping regions a respective type;

generating, by the one or more processors, one or more blocks of wrapping regions based on the classifications of the one or more wrapping regions;

generating, by the one or more processors, one or more tables based on one or more blocks of wrapping regions; and providing, by the one or more processors, an electronic document comprising the one or more tables.

2. The method of claim 1, wherein the digital document comprises data distributed on fixed locations on the least one rendered page.

3. The method of claim 1, wherein at least one of the horizontal separation threshold or the vertical separation threshold is determined by:
   determining a default value for at least one of the horizontal separation threshold the vertical separation threshold, and
   modifying least one of the horizontal separation threshold the vertical separation threshold based on one or more properties of the one or more wrapping regions.

4. The method of claim 1, wherein at least one of the horizontal separation threshold or the vertical separation threshold is determined based on:
   a number of overlaps between the one or more wrapping regions.

5. The method of claim 1, wherein at least one of the horizontal separation threshold or the vertical separation threshold is determined based on:
   a number of the one or more wrapping regions having a single-line.

6. The method of claim 1, wherein at least one of the horizontal separation threshold or the vertical separation threshold is determined based on:
   a number of the one or more wrapping regions having multiple lines and not overlapping any other ones of the one or more wrapping regions.

7. The method of claim 1, wherein the horizontal separation threshold is determined by:
   calculating, for each of a plurality of candidate horizontal separation thresholds, a respective score for that candidate horizontal separation threshold based on one or more properties of the one or more wrapping regions, and
   selecting one of the plurality of candidate horizontal separation thresholds as the horizontal separation threshold based on the scores.

8. The method of claim 1, wherein the vertical separation threshold is determined by:
   calculating, for each of a plurality of candidate vertical separation thresholds, a respective score for that candidate vertical separation threshold based on one or more properties of the one or more wrapping regions, and
   selecting one of the plurality of candidate vertical separation thresholds as the vertical separation threshold based on the scores.

9. The method of claim 1, wherein assigning each of the one or more wrapping regions a respective type comprises assigning each of the one or more wrapping regions at least one of:
   a tabular type,
   a narrative type, or
   a label type.

10. The method of claim 1, wherein the one or more processors are implemented on a cloud computing system, and wherein the digital document is received by the one or more processors from a computer systems remote from the cloud computing system.

11. A system comprising:
    one or more processors;
    one or more non-transitory computer-readable media including one or more sequences of instructions which, when executed by the one or more processors, causes the one or more processors to perform operations comprising:
    receiving a digital document comprising at least one rendered page;
    generating one or more wrapping regions based on the digital document, wherein each wrapping region comprises one or more fragment runs, and wherein each fragment run comprises one or more text fragments of the digital document that are adjacent to one another and within a horizontal separation threshold and a vertical separation threshold;
    classifying each of the one or more wrapping regions, wherein classifying each of the one or more wrapping regions comprises assigning each of the one or more wrapping regions a respective type;
    generating one or more blocks of wrapping regions based on the classifications of the one or more wrapping regions;
    generating one or more tables based on one or more blocks of wrapping regions; and
    providing an electronic document comprising the one or more tables.

12. The system of claim 11, wherein the digital document comprises data distributed on fixed locations on the least one rendered page.

13. The system of claim 11, wherein at least one of the horizontal separation threshold or the vertical separation threshold is determined by:
    determining a default value for at least one of the horizontal separation threshold the vertical separation threshold, and
    modifying least one of the horizontal separation threshold the vertical separation threshold based on one or more properties of the one or more wrapping regions.

14. The system of claim 11, wherein at least one of the horizontal separation threshold or the vertical separation threshold is determined based on:
    a number of overlaps between the one or more wrapping regions.

15. The system of claim 11, wherein at least one of the horizontal separation threshold or the vertical separation threshold is determined based on:
    a number of the one or more wrapping regions having a single-line.

16. The system of claim 11, wherein at least one of the horizontal separation threshold or the vertical separation threshold is determined based on:
    a number of the one or more wrapping regions having multiple lines and not overlapping any other ones of the one or more wrapping regions.

17. The system of claim 11, wherein the horizontal separation threshold is determined by:
    calculating, for each of a plurality of candidate horizontal separation thresholds, a respective score for that candidate horizontal separation threshold based on one or more properties of the one or more wrapping regions, and selecting one of the plurality of candidate horizontal separation thresholds as the horizontal separation threshold based on the scores.

18. The system of claim 11, wherein the vertical separation threshold is determined by:

calculating, for each of a plurality of candidate vertical separation thresholds, a respective score for that candidate vertical separation threshold based on one or more properties of the one or more wrapping regions, and selecting one of the plurality of candidate vertical separation thresholds as the vertical separation threshold based on the scores.

19. The system of claim 11, wherein assigning each of the one or more wrapping regions a respective type comprises assigning each of the one or more wrapping regions at least one of:

a tabular type, a narrative type, or a label type.

20. The system of claim 11, further comprising a cloud computing system comprising the one or more processors, and wherein the digital document is received by the one or more processors of the cloud computing system from a computer systems remote from the cloud computing system.

* * * * *